United States Patent
Takahashi

(10) Patent No.: US 9,478,014 B2
(45) Date of Patent: Oct. 25, 2016

(54) IMAGE PROCESSING METHOD FOR EXTRACTING LINEAR PATTERNS

(75) Inventor: Wataru Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 14/411,311

(22) PCT Filed: Jun. 29, 2012

(86) PCT No.: PCT/JP2012/004263
§ 371 (c)(1),
(2), (4) Date: Dec. 24, 2014

(87) PCT Pub. No.: WO2014/002148
PCT Pub. Date: Jan. 3, 2014

(65) Prior Publication Data
US 2015/0206286 A1 Jul. 23, 2015

(51) Int. Cl.
*G06K 9/40* (2006.01)
*G06K 9/48* (2006.01)
(Continued)

(52) U.S. Cl.
CPC .............. *G06T 5/002* (2013.01); *G06T 5/005* (2013.01); *G06T 7/0085* (2013.01); *H04N 1/409* (2013.01); *G06T 2207/20136* (2013.01)

(58) Field of Classification Search
CPC ..... G06T 5/002; G06T 5/005; G06T 7/0085; G06T 2207/20136; H04N 1/409
USPC ........................ 382/195, 266, 275
See application file for complete search history.

(56) References Cited

U.S. PATENT DOCUMENTS 5,351,305 A * 9/1994 Wood ................... A61B 5/0263
382/128
5,867,606 A * 2/1999 Tretter ................... G06T 5/004
358/447
(Continued)

FOREIGN PATENT DOCUMENTS

JP S62-208178 A 9/1987
JP 2001-111835 A 4/2001
(Continued)

OTHER PUBLICATIONS

Bruna et al. ("Adaptive directional sharpening with overshoot control," Proc. SPIE. 6812, Image Processing: Algorithms and Systems VI, 681213, Feb. 14, 2008).*
(Continued)

*Primary Examiner* — Yubin Hung
(74) *Attorney, Agent, or Firm* — McDermott Will & Emery LLP

(57) ABSTRACT

An image processing apparatus of the disclosure performs image processing to an extraction image as an image of an extracted linear configuration appearing in an original image. Specifically, the image processing apparatus includes a line connecting processor configured to connect fragments of the linear configuration in the extraction image due to noises or the like to generate a fragment eliminated image. The line connecting processor interpolates pixels in the extraction image in an extending direction of the linear configuration based on a direction image while obtaining the extending direction of the linear configuration in the extraction image. Accordingly, the linear configuration is expanded in its extending direction. Such operation causes natural connection of the fragments of the linear configuration in the extraction image, achieving provision of an image with higher visibility.

8 Claims, 13 Drawing Sheets

(51) Int. Cl.
*G06T 7/00* (2006.01)
*G06T 5/00* (2006.01)
*H04N 1/409* (2006.01)

(56) References Cited

U.S. PATENT DOCUMENTS

| | | | |
|---|---|---|---|
| 6,614,432 B1* | 9/2003 | Merrill | G06T 11/203 345/428 |
| 6,763,129 B1 | 7/2004 | Honda et al. | |
| 2002/0054707 A1 | 5/2002 | Florent et al. | |
| 2005/0231603 A1* | 10/2005 | Poon | G06T 5/004 348/208.99 |
| 2010/0061601 A1* | 3/2010 | Abramoff | G06K 9/00617 382/117 |
| 2010/0094127 A1* | 4/2010 | Xu | A61B 5/0066 600/425 |
| 2011/0313285 A1* | 12/2011 | Fallavollita | A61B 6/4441 600/426 |
| 2013/0108133 A1* | 5/2013 | Inoue | G06T 3/0037 382/131 |

FOREIGN PATENT DOCUMENTS

| | | |
|---|---|---|
| JP | 2003-533307 A | 11/2003 |
| JP | 2009-226141 A | 10/2009 |

OTHER PUBLICATIONS

Lessard et al. ("Wires segmentation in fluoroscopic images during cerebral aneurysm endovascular intervention," May 14-17, 2008, IEEE International Symposium on Biomedical Imaging, pp. 193-196)—discloses connecting line segments.*

Baert et al. ("Guide-Wire Tracking During Endovascular Interventions," IEEE Transactions On Medical Imaging, Aug. 2003, vol. 22, No. 8, p. 965-972).*

Fallavollita et al. ("Towards an Automatic Coronary Artery Segmentation Algorithm," Aug. 30-Sep. 3, 2006, Proceedings of the 28th IEEE EMBS Annual International Conference, pp. 3037-3040).*

International Search Report issued in International Application No. PCT/JP2012/004263 dated Oct. 2, 2012.

* cited by examiner

Potition

IMAGE PROCESSING METHOD FOR EXTRACTING LINEAR PATTERNS

RELATED APPLICATION

This application is the U.S. National Phase under 35 U.S.C. §371, of International Application No. PCT/JP2012/004263, filed on Jun. 29, 2012, the disclosure of which Application are incorporated by reference herein.

TECHNICAL FIELD

The present invention relates to an image processing apparatus that performs image processing in radiography such that a linear configuration is readily visible.

BACKGROUND ART

Medical institutions are equipped with a radiographic apparatus configured to capture an image of a subject with radiation. Examples of such a radiographic apparatus include one used for imaging a guide wire inserted into a blood vessel of the subject. Such an image processing apparatus is described, for example, in Patent Literature 1.

When the radiographic apparatus captures a fluoroscopy image of the subject, the guide wire does not always appear clearly in the image. Accordingly, the currently-used radiographic apparatus performs image processing so as to enhance visibility of the guide wire in the image. The following describes the concrete image processing currently performed. In the image processing described in Patent Literature 1, statistical processing is performed to remove noises in the image. Here, removing the noises causes no elimination of the guide wire. Consequently, in the currently-used apparatus, removing the noises leads to obtain an image with a clear figure of the guide wire.

Patent Literature 1: Japanese Patent Publication No. 2001-1835A

SUMMARY OF INVENTION

Technical Problem

However, the currently-used image processing has the following drawback. Specifically, only an image with low visibility is obtainable through the currently-used image processing. In other words, the figure of the guide wire cannot be highlighted through the currently-used image processing.

An unclear figure of the guide wire in the image does not always result from the noises in the image. For instance, the guide wire is itself light-colored in the image, which may lead to poor visibility of the guide wire in the image. The currently-used apparatus cannot perform image processing to highlight the guide wire. Consequently, the light-colored guide wire in the image does not change even with the currently-used image processing. That is, only the image with low visibility is obtainable through the currently-used image processing.

The present invention has been made regarding the state of the art noted above, and its object is to provide an image processing apparatus that allows obtaining an image with high visibility.

Solution to Problem

The present invention adopts the following construction for overcoming the above drawback. One embodiment of the present invention discloses an image processing apparatus that processes an original image obtained by conducting fluoroscopy to a subject. The image processing apparatus includes an evaluation image generating device configured to generate an evaluation image used for evaluating whether or not each of pixels in the original image belongs to a linear configuration in the original image; a direction image generating device configured to generate a direction image based on the original image, the direction image indicating a direction in which a line extends under an assumption that each of the pixels corresponds to the linear configuration in the original image; a difference image generating device configured to generate a difference image based on the direction image, the difference image being obtained by subtracting a pixel value not corresponding to the linear configuration from a pixel value corresponding to the linear configuration; an extraction image generating device configured to generate an extraction image with the linear configuration in the original image extracted therefrom based on the evaluation image and the difference image; and a line connecting device configured to connect fragments of the linear configuration in the extracted image to generate a fragment eliminated image by obtaining an extending direction of the linear configuration in the extraction image based on the direction image, determining a start point pixel and an end point pixel arranged in the extending direction of the linear configuration in the extraction image, and interpolating between the two pixels.

[Operation and Effect] With the embodiment mentioned above, the image processing can be performed that highlights the linear configuration appearing in the original image. Specifically, the linear configuration in the original image is distinguished by two approaches. The first approach is to generate the evaluation image used for evaluating whether or not each of the pixels corresponds to the linear configuration in the original image. This achieves positional identification of the linear configuration in the original image. The second approach is to generate the difference image with the linear configuration appearing therein. The difference image is obtained by calculating difference in pixel value between the linear configuration and a portion other than the linear configuration in the original image. This allows determination of difference in pixel value of the linear configuration from the portion other than the linear configuration in the image. Here, the evaluation image merely contains positional information on the linear configuration in the original image. On the other hand, the difference image contains a false image derived from differential processing for direction to the entire original image. Accordingly, extracting the linear configuration using the two images with such the demerits allows compensation for the demerits of the two approaches each other. Consequently, the obtained extraction image contains the linear configuration extracted only from the original image with a maintained contrast, and thus has high visibility.

Moreover, the embodiment includes the line connecting device configured to generate the fragment eliminated image by connecting the fragments of the linear configuration in the extraction image generated due to noises or the like. Here, the line connecting device interpolates the pixels on the extraction image in the extending direction of the linear configuration while obtaining the extending direction of the linear configuration in the extraction image based on the direction image. Accordingly, the linear configuration is expanded in its extending direction. Such operation causes natural connection of the fragments of the linear configuration in the extraction image, achieving provision of the image with higher visibility.

Moreover, the line connecting device in the image processing apparatus determines a pixel, whose pixel value equal to or more than a threshold, from the pixels in the extraction image as the start point pixel. Such is more preferable.

[Operation and Effect] The above is a concrete construction of the present invention. The line connecting device determines a pixel having a pixel value, whose absolute value is equal to or more than a threshold, from the pixels in the extraction image as the start point pixel. This ensures to perform line connection to the linear configuration noticeable in the extraction image.

Moreover, upon determining the end point pixel from candidate pixels in the extraction image, the line connecting device of the image processing apparatus obtains a direction of connecting each of the candidate pixels with the start point pixel set in advance, obtains the extending direction of the linear configuration containing the start point pixel from the direction image, and preferentially determines one of the candidate pixels as the end point pixel, the one having been determined to have the highest degree of coincidence of the two obtained directions. Such is more preferable.

[Operation and Effect] The above is a concrete construction of the present invention. That is, the line connecting device obtains the direction of connecting each of the candidate pixels of the end point pixel as an end point of connecting the lines with the start point pixel set in advance. In addition, the line connecting device obtains an extending direction of the linear configuration containing the start point pixel from the direction image, and preferentially determines one of the candidate pixels as the end point pixel, the one having been determined to have the highest degree of coincidence of the two obtained directions. This allows suitable selection of the end point pixel from the candidate pixels. When the linear configuration is expanded from the start point pixel to the candidate pixel having been determined to have the highest degree of coincidence of the two obtained directions, the linear configuration is to be expanded in its extending direction of the linear configuration. In other words, performing the line connection based on the above determination allows more natural connection of the linear configuration.

Moreover, the line connecting device of the image processing apparatus preferentially determines the candidate pixel having been determined to have a high absolute value of the pixel value from the candidate pixels in the extraction image as the end point pixel by obtaining absolute values of the pixel values of the candidate pixels from the extraction image. Such is more preferable.

[Operation and Effect] The above is a concrete construction of the present invention. That is, the candidate pixel having been determined to have a high absolute value of the pixel is preferentially determined as the end point pixel, ensuring to perform the line connection to the linear configuration noticeable in the extraction image.

Moreover, the line connecting device of the image processing apparatus performs line connection by changing a pixel value of a pixel between the start point pixel and the end point pixel.

[Operation and Effect] The above is a concrete construction of the present invention. That is, the line connection is performed by changing the pixel values of the pixels between the start point pixel and the end point pixel. Accordingly, the line connection is completed by changing only a few pixels.

Moreover, upon determining a changed pixel value prior to changing the pixel value, the line connecting device of the image processing apparatus calculates a distance between the start point pixel and a target subjected to pixel change and a distance between the end point pixel and the target subjected to the pixel change, and determines the changed pixel value so as to approach a pixel value of either the start point pixel or the end point pixel not farther from but closer to the target subjected to the pixel change. Such is more preferable.

[Operation and Effect] The above is a concrete construction of the present invention. The pixel value is changed during the line connection so as to approach the pixel value of either the start point pixel or the end point pixel not farther from but closer to a target subjected to pixel change. Accordingly, the start point pixel is connected to the end point pixel more smoothly. That is, when a variation of the pixel value between the start point pixel and the end point pixel is observed after the line connection, the pixel value of the start point pixel gradually changes to the pixel value of the end point pixel. In this manner, the line connection is performed while no large difference in pixel value is provided between the start point pixel and the end point. Consequently, a fragment eliminated image with superior visibility is obtainable.

Moreover, upon determining a changed pixel value prior to changing the pixel value, the line connecting device of the image processing apparatus uses a pixel value with a higher absolute value when a plurality of changed pixel values is calculated at the same position in the extraction image. Such is more preferable.

[Operation and Effect] The above is a concrete construction of the present invention. Upon determining a changed pixel value prior to changing the pixel value, the line connecting device operates to use a pixel value with a higher absolute value from a plurality of changed pixel values calculated at the same position in the extraction image. Consequently, a fragment eliminated image with superior visibility is obtainable. That is, when a pixel value of a pixel located at an intersection of a dark line and a light line is changed, the line connection is preferentially performed to the dark line. In this manner, the line connecting device ensures to connect the dark line noticeable in the original image to perform the line connection.

Moreover, the image processing apparatus further includes a superimposed image generating device configured to superimpose the fragment eliminated image on the original image to generate a superimposed image. The line connecting device determines the changed pixel value, and thereafter controls the changed pixel value so as the absolute value thereof to be more than the absolute values of the pixel values of the start point pixel and the end point pixel, thereby highlighting an expanded line in the fragment eliminated image. Such is more preferable.

[Operation and Effect] The above is a concrete construction of the present invention. Superimposing the fragment eliminated image on the original image allows generation of a superimposed image with superior visibility having combination of a fine configuration of the subject in the original image and a clear linear configuration in the fragment eliminated image. Here, the linear configuration does not appear on the pixel in the original image whose position corresponds to a position of the pixel subjected to the line connection in the fragment eliminated image. Consequently, the pixel with superimposition of the pixel subjected to the line connection in the fragment eliminated image and the pixel in the original image at the same position has a lower pixel value by a small density of the pixels in the original image. Accordingly, the above embodiment controls the absolute value of the changed pixel value to be higher. Such a construction eliminates generation of a partially-thin linear configuration in the superimposed image, achieving a superimposed image with superior visibility.

Advantageous Effects of Invention

The image processing apparatus of the present invention performs image processing to the extraction image as an image with an extracted linear configuration appearing in the original image. Specifically, the image processing apparatus includes the line connecting device configured to connect the fragments of the linear configuration in the extraction image to generate the fragment eliminated image. The line connecting device interpolates the pixels in the extraction image in the extending direction of the linear configuration based on the direction image while obtaining the extending direction of the linear configuration in the extraction image. Accordingly, the linear configuration is expanded in its extending direction. Such operation causes natural connection of the fragments of the linear configuration in the extraction image, achieving provision of the image with higher visibility.

DESCRIPTION OF EMBODIMENTS

The following describes embodiments for carrying out the present invention.

Embodiment 1

The following describes the embodiments of the present invention. Here, X-rays in the embodiments correspond to radiation in the present invention. A dark line such as a figure of a guide wire in an image corresponds to a linear configuration in the present invention.

Figure 1:
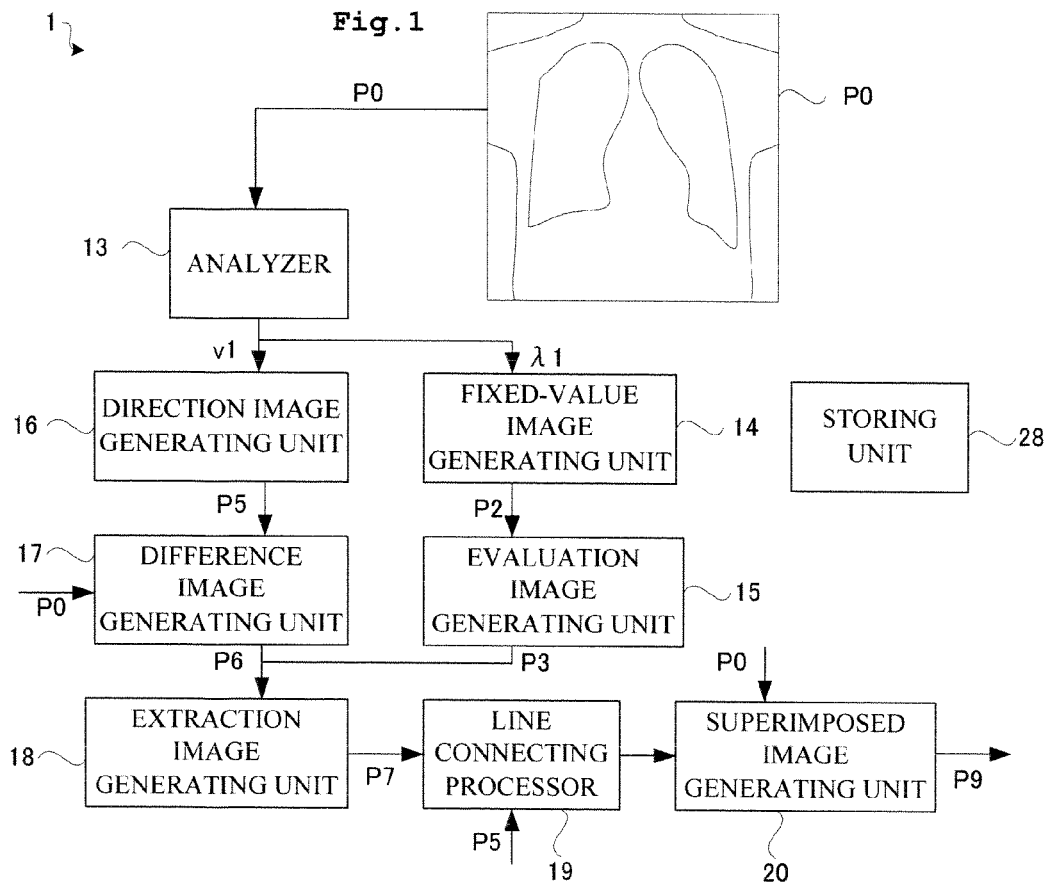
FIG. 1 is a function block diagram illustrating an image processing apparatus according to one embodiment of the present invention.

As illustrated in FIG. 1, an image processing apparatus 1 according to Embodiment 1 inputs an image (referred to as an original image P0) obtained by imaging a subject with X-rays, and thereafter outputs a processed image (superimposed image P9). The processed image is controlled such that luminance of a dark line such as a figure of a guide wire in the original image P0 is visible.

<Whole Construction of Image Processing Apparatus>

As illustrated in FIG. 1, the image processing apparatus 1 according to Embodiment 1 includes an analyzer 13, an evaluation image generating unit 15, a direction image generating unit 16, a difference image generating unit 17, and an extraction image generating unit 18. The analyzer 13 analyzes the original image P0 with a two-dimensional Hessian matrix. The evaluation image generating unit 15 generates an evaluation image P3 used for evaluating whether or not each of pixels corresponds to the linear configuration in the original image P0. The direction image generating unit 16 generates a direction image P5 representing an extending direction of the linear configuration based on the original image P0 when it is evaluated that each of the pixels corresponds to the linear configuration in the original image P0. The difference image generating unit 17 generates a difference image P6 obtained by subtracting pixel values other than those not corresponding to the linear configuration from the pixel values corresponding on the linear configuration based on the direction image P5. The extraction image generating unit 18 generates an extraction image P7 with the linear configuration in the original image P0 extracted from the original image P0 with maintained contrast of the linear configuration in the original image P0 based on the evaluation image P3 and the difference image P6. Here, the evaluation image generating unit 15 corresponds to the evaluation image generating device in the present invention. The direction image generating unit 16 corresponds to the direction image generating device in the present invention. The difference image generating unit 17 corresponds to the difference image generating device in the present invention. The extraction image generating unit 18 corresponds to the extraction image generating device in the present invention.

The image processing apparatus 1 according to Embodiment 1 further includes a line connecting processor 19. The line connecting processor 19 generates a fragment eliminated image P8 based on the direction image P5 by connecting fragments of the linear configuration in the extraction image P7. Here, the line connecting processor 19 corresponds to the line connecting device in the present invention.

The image processing apparatus 1 further includes a superimposed image generating unit 20. The superimposed image generating unit 20 generates a superimposed image (superimposed image P9) by superimposing the fragment eliminated image P8 on the original image P0. The image processing apparatus 1 further includes a fixed-value image generating unit 14. The fixed-value image generating unit 14 generates a fixed-value image P2 having arranged fixed values as resultant of analyzing the original image P0 by the analyzer 13, and outputs the fixed-value image P2 to the evaluation image generating unit 15. Here, the superimposed image generating unit 20 corresponds to the superimposed image generating device in the present invention.

A storing unit 28 is a storage configured to store filters or parameters for operating each of the elements 13, 14, 15, 16, 17, 18, 19, 20. The elements 13, 14, 15, 16, 17, 18, 19, 20 are each accessible to the storing unit 28 as appropriate.

<Primary Operation of Image Processing Apparatus>

The following describes primary operation of the image processing apparatus 1. The image processing apparatus 1 primarily operates with the analyzer 13, the fixed-value image generating unit 14, the evaluation image generating unit 15, the direction image generating unit 16, the difference image generating unit 17, the extraction image generating unit 18, and the line connecting processor 19. Among these, operations of the elements 13, 14, 15, 16, 17 are to be described firstly collectively, and thereafter, operation of the line connecting processor 19 is to be described.

<Operation of Analyzer>

Figure 2:
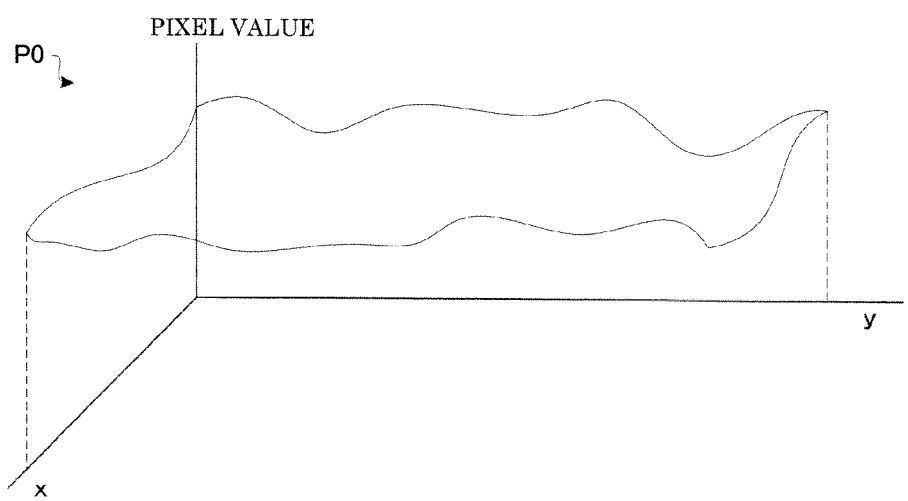
FIGS. 2 to 10 are schematic views each illustrating operation of the image processing apparatus according to the embodiment.

The image processing apparatus 1 receives the original image P0 and inputs the image to the analyzer 13. The following describes differential processing of the analyzer 13. The original image P0 includes a relationship between a position and a pixel value. In other words, when a position in the original image P0 is specified in x- and y-directions, a pixel value of a pixel located in the position is obtainable. That is, as illustrated in FIG. 2, the original image P0 can be interpreted as a two-variable function with two variables in the x-direction (i.e., a horizontal direction) and the y-direction (i.e., a vertical direction) associated with pixel values. When the pixel value is denoted by d, a relationship d=f(x, y) holds.

The analyzer 13 conducts partial differentiation to the original image P0 in the x-direction using a differential filter to obtain a differential function, and then further conducts partial differentiation to the obtained differential function in the x-direction. Moreover, the analyzer 13 conducts partial differentiation to the original image P0 in the x-direction to obtain the differential function, and then further conducts partial differentiation to the differential function in the y-direction. Similarly, the analyzer 13 conducts partial differentiation to the original image P0 in the y-direction to obtain a differential function, and then further conducts partial differentiation to the differential function in the y-direction. The analyzer 13 generates a Hessian matrix H using these functions. The Hessian matrix H is like a matrix as under.

$$H = \begin{pmatrix} \frac{\partial^2 f}{\partial x^2} & \frac{\partial^2 f}{\partial x \partial y} \\ \frac{\partial^2 f}{\partial y \partial x} & \frac{\partial^2 f}{\partial y^2} \end{pmatrix}$$

Here, the second-order differential function subjected to the partial differentiation in the x-direction and the following partial differentiation in the y-direction is same as the second-order differential function subjected to the partial differentiation in the y-direction and the following partial differentiation in the x-direction. Consequently, the Hessian matrix is a symmetric matrix, and contains two fixed values $\lambda 1$, $\lambda 2$ and fixed vectors corresponding thereto. At this time, it is assumed that an absolute value of the fixed value $\lambda 1$ is higher than that of the fixed value $\lambda 2$. The analyzer 13 determines the fixed values and the fixed vectors from the Hessian matrix H.

Next, the analyzer 13 calculates a fixed vector v1 corresponding to the fixed value $\lambda 1$. The fixed vector v1 includes an element in the x- and y-directions.

<Operation of Fixed-Value Image Generating Section>

The analyzer 13 transmits the fixed value $\lambda 1$ with the maximum absolute value to the fixed-value image generating unit 14. The Hessian matrix H is a matrix of the functions corresponding to the positions in the original image P0. Accordingly, the fixed value $\lambda 1$ should vary depending on the position in the original image P0. The fixed-value image generating unit 14 arranges the fixed value $\lambda 1$ in association with the position in the original image P0, thereby generating a fixed-value image P2 with the fixed value $\lambda 1$ arranged in a two-dimensional matrix array.

<Operation of Evaluation Image Generating Section>

The fixed-value image generating unit 14 transmits the fixed-value image P2 to the evaluation image generating unit 15. The evaluation image generating unit 15 adjusts the fixed values $\lambda 1$ by applying a given function to each of the fixed values $\lambda 1$. Specifically, the evaluation image generating unit 15 converts every high positive fixed values $\lambda 1$ in the fixed-value image P2 into a value of approximately 1. Thereafter, the evaluation image generating unit 15 converts every low fixed values $\lambda 1$ in the fixed-value image P2 into a value of approximately 0. Moreover, the evaluation image generating unit 15 converts the middle fixed values $\lambda 1$ in the fixed-value image P2 into any of a value from 0.1 to 0.9, for example. In this manner, the fixed values $\lambda 1$ in the fixed-value image P2 from −16,384 to 16,383 are all converted to be in a range of 0 to 1.

Figure 3:
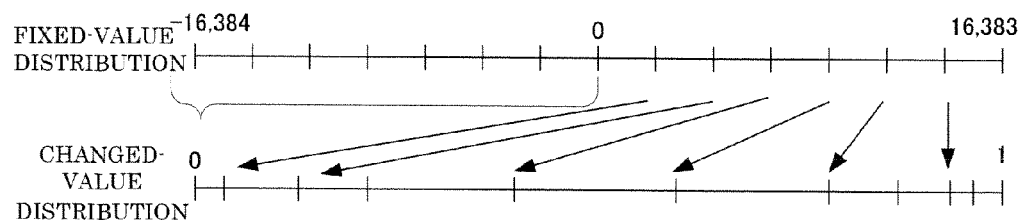

The evaluation image generating unit 15 selects a non-linear and monotonically increasing function for use in the conversion. That is, a logistic function is used. As illustrated in FIG. 3, the evaluation image generating unit 15 converts the pixel values by compressing scales of the extreme fixed values $\lambda 1$ or negative fixed values $\lambda 1$ while maintaining scales of the middle positive fixed values $\lambda 1$ in the fixed-value image P2. In this manner, the evaluation image generating unit 15 converts the fixed-value image P2 to generate an evaluation image P3. Here, the negative fixed values $\lambda 1$ are all converted into a value of 0.

Figure 4:
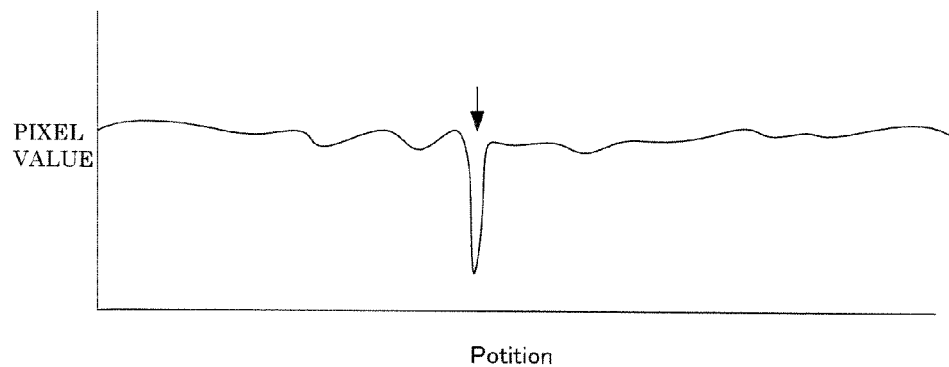

The following describes a meaning of the fixed value $\lambda 1$. A high absolute value of the fixed value $\lambda 1$ means a high absolute value of a second-order partial differentiation value in the original image P0. Moreover, the numeral given to the fixed value $\lambda 1$ directly corresponds to the numeral of the second-order partial differentiation value. The absolute value of the second-order partial differentiation value represents how a U-curve in the function is sharp. The numerals given to the second-order partial differentiation values correspond to projections and depressions in the U-curve. For instance, it is assumed that a relationship between a position and a pixel value exists as illustrated in FIG. 4. FIG. 4 illustrates a graph with a deep depression indicated by an arrow. Such a portion has a pixel value extremely lower than that therearound. Accordingly, the portion represents a dark line in the image. When second order differential is conducted to the graph along the position in FIG. 4, the differential value becomes a high positive value at a position indicated by the arrow. That is, the evaluation image P3 having the arranged converted values obtained by scaling the fixed values represents a position of the extremely low pixel value when seen the original image P0 as the function having the relationship between the position and the pixel value. In the evaluation image P3, a portion having a value approximate to 1 corresponds to the dark line in the original image P0, whereas a portion having a value approximate to 0 corresponds to a flat portion with no dark line in the original image P0.

On the other hand, a light line in the original image P0 has a negative low differential value. That is, for extracting the light line, the evaluation image generating unit 15 selects a monotonously decreasing and non-linear function for use in the conversion. Specifically, the evaluation image P3 having the arranged converted valued obtained by scaling the fixed values represents a position of the extremely high pixel value when seen the original image P0 as the function having the relationship between the position and the pixel value. In the evaluation image P3, a portion having a value approximate to 1 corresponds to the light line in the original image P0, whereas a portion having a value approximate to 0 corresponds to a flat portion with no light line in the original image P0.

<Operation of Direction Image Generating Section>

The analyzer 13 transmits the fixed vector v1 to the direction image generating unit 16. The direction image generating unit 16 calculates an angle θ1 which the fixed vector v1 forms with an x-axis. Then the analyzer 13 adds 90 degrees to the angle θ1 to calculate an angle θ2. Here, the Hessian matrix H is a matrix of the functions corresponding to the positions in the original image P0. Accordingly, the angle θ2 should vary in value depending on the position in the original image P0. The direction image generating unit 16 arranges the angles θ2 so as to correspond to the positions in the original image P0, and generates a direction image P5 with the angles θ2 being arranged in a two-dimensional matrix array.

In actual, the value of the angle θ2 in the direction image P5 is invariable from 0 to 360 degrees. That is, the angle θ2 is discretized to be an angle approximate to any of 0, 18, 36, 54, 72, 90, 108, 126, 144, and 162 degrees. Consequently, the direction image P5 has values arranged in the two-dimensional matrix array, the values indicating any of ten different angles from 0 to 162 degrees. In this manner, the direction image generating unit 16 generates the direction image P5 while selecting the ten different angles, simplifying the following arithmetic processing. Here, the reason for the angle θ2 of not less than 360 degrees and the maximum thereof of 16 degrees is to be mentioned later.

Figure 5:
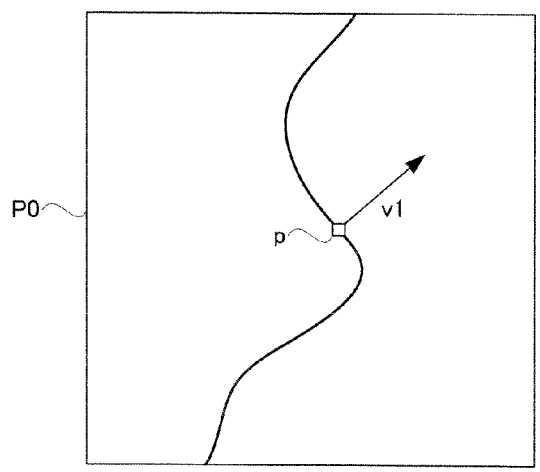

The following describes a meaning of the angle θ2. The angle θ2 is an angle of rotating the angle which the fixed vector v1 forms with the x-axis by 90 degrees. The following describes the meaning of a direction of the fixed vector v1. Here, a pixel p on the dark line in the original image P0 as illustrated in FIG. 5 is to be considered. A fixed vector for the pixel p is denoted by v1 in FIG. 5. The fixed vector v1 is for the fixed value λ1 having a higher absolute value. Consequently, a direction indicated by the fixed vector v1 corresponds to a direction orthogonal to a connection direction of the dark line at the pixel p in the original image P0. In other words, the angle θ2 represents an angle which the direction of rotating the direction orthogonal to the dark line by 90 degrees forms with the x-direction. To put it simply, the angle θ2 represents an angle which the direction along the dark line in the original image P0 forms with the x-direction. The direction along the dark line means an extending direction of a tangent line contacting the dark line at the pixel p.

Figure 6:
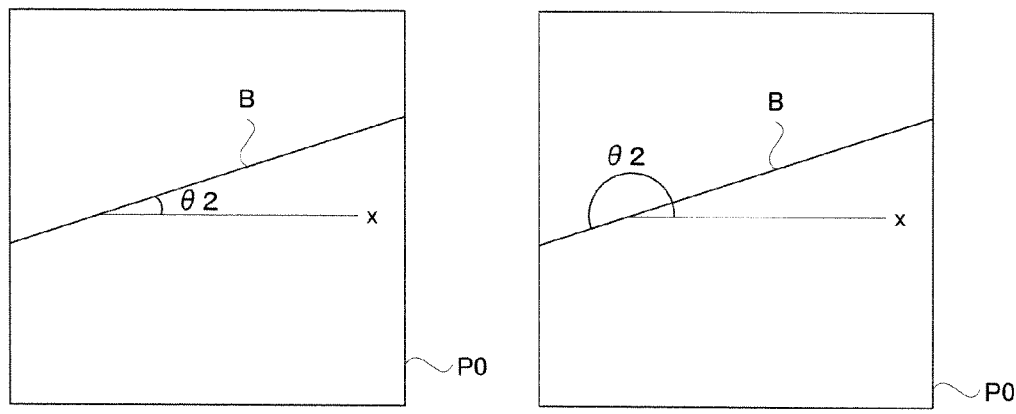

The following describes the reason why the maximum of the angle θ2 is 162 degrees. With the angle θ2 of 18 degrees, an angle which the dark line B forms with the x-axis is 18 degrees as illustrated on the left of FIG. 6. Similarly, with the angle θ2 of 198 degrees, an angle which the dark line B forms with the x-axis is 198 degrees as illustrated on the right of FIG. 6. As seen from comparison of the left and the right of FIG. 6, the dark line B with the angle θ2 of 18 degrees conforms to the dark line B with the angle of 198 degrees. That is, adding 180 degrees to the angle θ2 causes the direction of the dark line B represented by the angle to be the same as that represented by the original angle θ2. In other words, the angle θ2 from 0 to 180 degrees can represent all directions of the dark line B. Since the angle θ2 is discretized, the maximum angle to be obtained is actually 162 degrees.

<Operation of Difference Image Generating Section>

The direction image P5 is transmitted to the difference image generating unit 17. The difference image generating unit 17 obtains a difference between the linear configuration in the original image and a portion other than the linear configuration while referring to the direction image P5, thereby generating a difference image with the linear configuration appearing therein. The following describes operation of the difference image generating unit 17.

Figure 7:
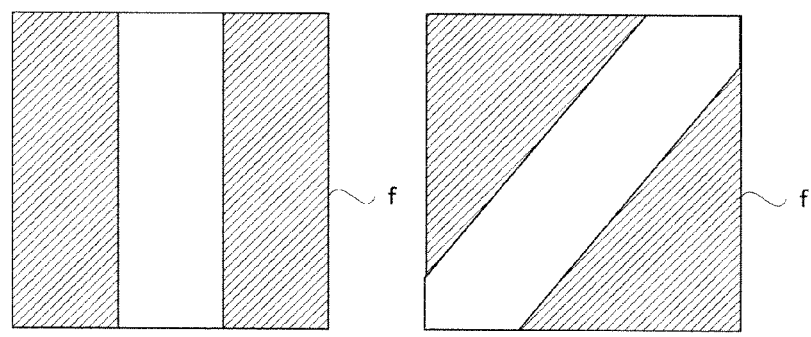

FIG. 7 illustrates on the left thereof a filter generated by the difference image generating unit 17. A filter f on the left of FIG. 7 is formed by three regions. The filter f is a difference filter that obtains a difference in pixel value between the center region and diagonally-shaded regions adjacent thereto. Applying the filter f to the original image P0 allows determination of a degree of difference in pixel value between a target pixel and surrounding pixels. For instance, the filter f has a size of 15 by 15 pixels.

The filter f that the difference image generating unit 17 uses is also a directional anisotropic filter (anisotropic smoothing filter). For instance, the filter f illustrated on the left of FIG. 7 is suitable for the original image P0 with the dark line appearing therein vertically. However, the original image P0 actually contains a curved dark line. Consequently, when applying the filter to the original image P0, the difference image generating unit 17 should change the filter depending on the direction in which the dark line extends. Then, the storing unit 28 stores a plurality of filters such as one illustrated on the right of FIG. 7. The plurality of filters is obtained by rotating the filter on the left of FIG. 7 by every 18 degrees. The difference image generating unit 17 applies any of the filters in the storing unit 28 for each of the pixels constituting the original image P0, thereby generating the difference image. The types of filters for such operation are prepared depending on the direction in which the dark line extends.

The difference image generating unit 17 is required to determine which filter is selected from the ten filters to be applied to each of the pixels of the original image P0. The difference image generating unit 17 selects the filter while referring to the direction image P5. The direction image P5 represents the direction in which the dark line appearing in each of the pixels extends. Consequently, the difference image generating unit 17 selects a filter for each of the pixels constituting the original image P0 depending on ten directions represented in the direction image P5, and applies the filter, thereby generating the difference image P6. Here, the difference image P6 is obtained by performing smooth processing to the original image P0 in the extending direction of the dark line and contains the pixel value of the dark line obtained by subtracting the pixel values of a portion other than the dark line.

Figure 8:
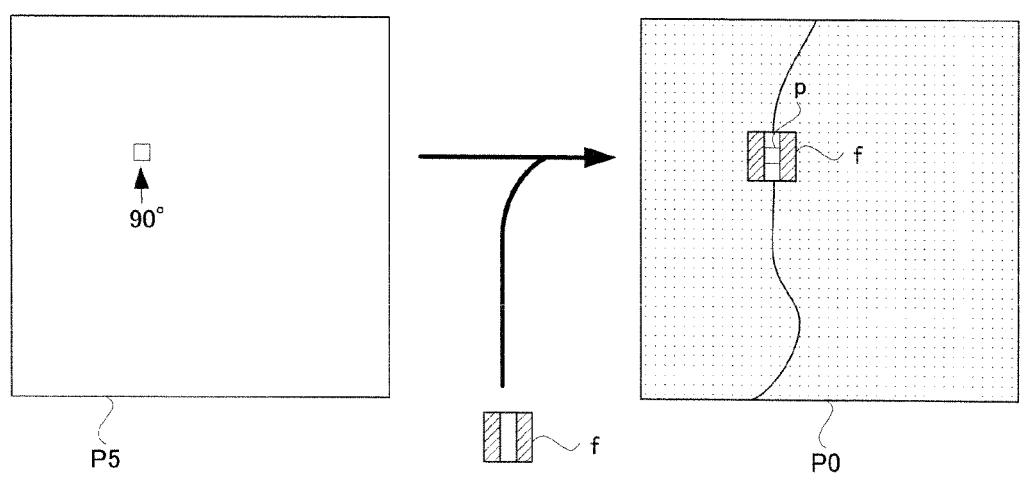

FIG. 8 illustrates operation of the difference image generating unit 17 to a pixel p in the original image P0. The difference image generating unit 17 obtains a pixel value of a pixel (corresponding pixel) in the direction image P5 located at the same position as the pixel p in the original image P0. The pixel value of the direction image P5 has a value representing the extending direction of the dark line. It is assumed that the corresponding pixel has a pixel value representing an angle of 90 degrees. Accordingly, the difference image generating unit 17 reads out the vertical filter f already described with the left of FIG. 7 from the storing unit 28, and applies the filter f to the pixel p in the original image P0. At this time, the pixel p is located on the center of the filter f. The difference image generating unit 17 operates similarly to each of the pixels constituting the original image P0, thereby generating a difference image P6 as illustrated in FIG. 9.

Figure 9:
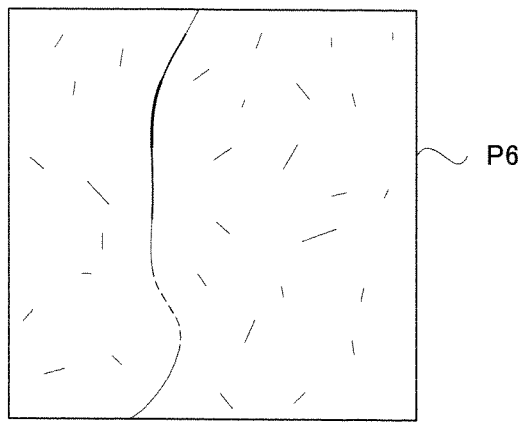

As illustrated in the difference image P6 in FIG. 9, the figure of the subject appearing in the original image P0 is eliminated, and the dark line in the original image P0 remains. In FIG. 8, the figure of the subject in the original image P0 is hatched. The dark line appearing in the difference image P6 holds information on the pixel values of the original image P0. Consequently, when seen the dark line appearing in the difference image P6 carefully, it is determined that the dark line has a partial variation in thickness. Such a partial variation in thickness of the dark line directly represents partial difference in thickness of the dark line in the original image P0.

Moreover, as illustrated in FIG. 9, the difference image P6 contains noises in fine lines beside the dark line. The noises correspond to a false image generated by applying the directional filter to the original image P0 entirely. The false image should be removed. The extraction image generating unit 18 removes the false image.

<Operation of Extraction Image Generating Section>

The difference image P6 and the evaluation image P3 are transmitted to the extraction image generating unit 18. The extraction image generating unit 18 performs integration to the evaluation image P3 and the difference image P6, thereby generating an extraction image P7 obtained by extracting the dark line from the original image P0. The evaluation image P3 includes a portion 1 and a portion 0, the portion 1 corresponding to the dark line in the original image P0 and the portion 0 corresponding to a portion other than the dark line in the original image P0. Although containing the pixel values in a range of 0 to 1, the evaluation image P3 is almost a binary image representing a position of the dark line in the original image P0. Consequently, the evaluation image P3 contains no information representing a thickness of the dark line in the original image P0. Since the difference image P6 is obtained by applying a directional filter to the original image P0, the difference image P6 holds information on thickness of the dark line. However, the original image P0 contains the false image through application of the directional filter.

Figure 10:
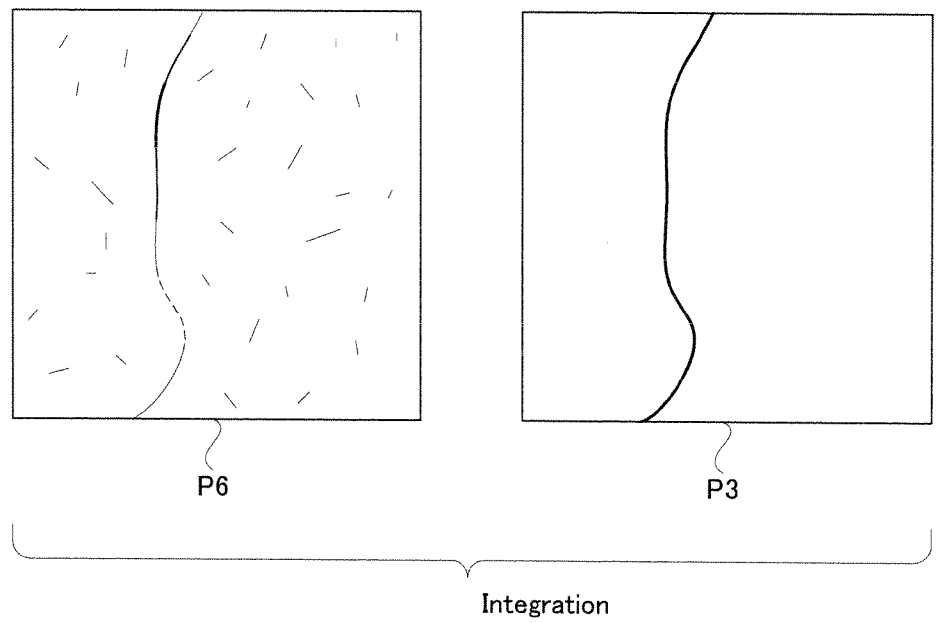
Figure 10:
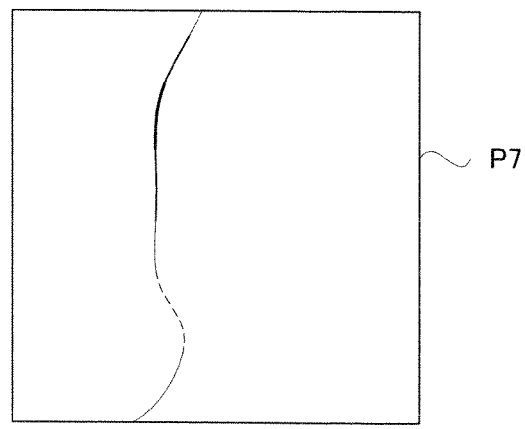

Then, as illustrated in FIG. 10, when integration is performed to the difference image P6 and the evaluation image P3, the pixel value of the difference image P6 with no dark line is integrated by the pixel value 0 of the evaluation image P3. Accordingly, the portion with no dark line has a pixel value of 0. In this manner, the false image appearing in the difference image P6 is eliminated. The generated extraction image P7 is like an image with the dark line in the original image P0 being extracted directly. In the extraction image P7, the dark line is readily visible.

<Operation of Line Connecting Processor>

Figure 11:
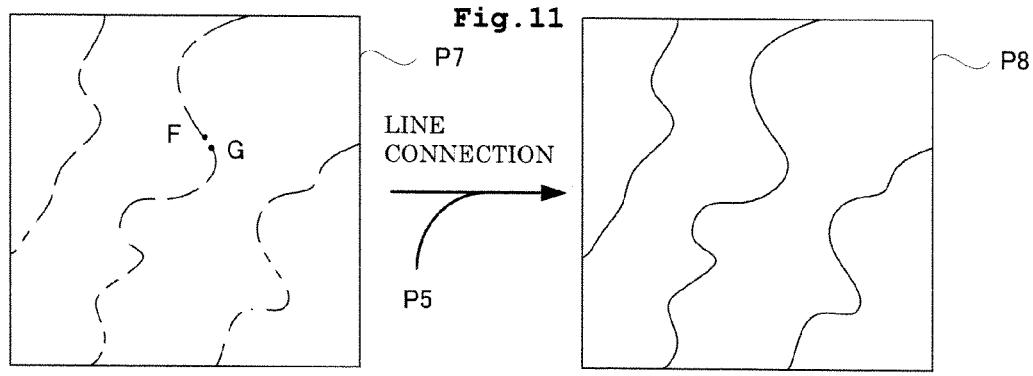
FIGS. 11 to 29 are schematic views each illustrating operation of a line connecting processor according to the embodiment.

The following describes operation of the line connecting processor 19, which is the most characteristic feature in the present invention. As illustrated in FIG. 11, the line connecting processor 19 performs line connection to the extraction image P7 with fragments of the linear configuration appearing therein due to noises or the like. Consequently, the line connecting processor 19 generates a fragment eliminated image P8 with the fragments of the linear configuration being eliminated therefrom. At this time, the line connecting processor 19 refers to the direction image P5. More specifically, the line connecting processor 19 determines both pixels of the start point and the end point that connect a line in the extraction image P7. Then, a short line is added between the two points to achieve the line connection. FIG. 11 illustrates the start point for the line connection as a frontier pixel F, and the end point as an end point pixel G. The line connecting processor 19 obtains an extending direction of the linear configuration in the extraction image P7 based on the direction image P5. Then, the line connecting processor 19 determines the frontier pixel F and the end point pixel G arranged in the extending direction of the linear configuration in the extraction image P7. Thereafter, the line connecting processor 19 interpolates between the two pixels. Accordingly, the fragments of the linear configuration in the extraction image P7 are connected to generate the fragment eliminated image P8. Here, the frontier pixel F corresponds to the start point pixel in the present invention.

Figure 12:
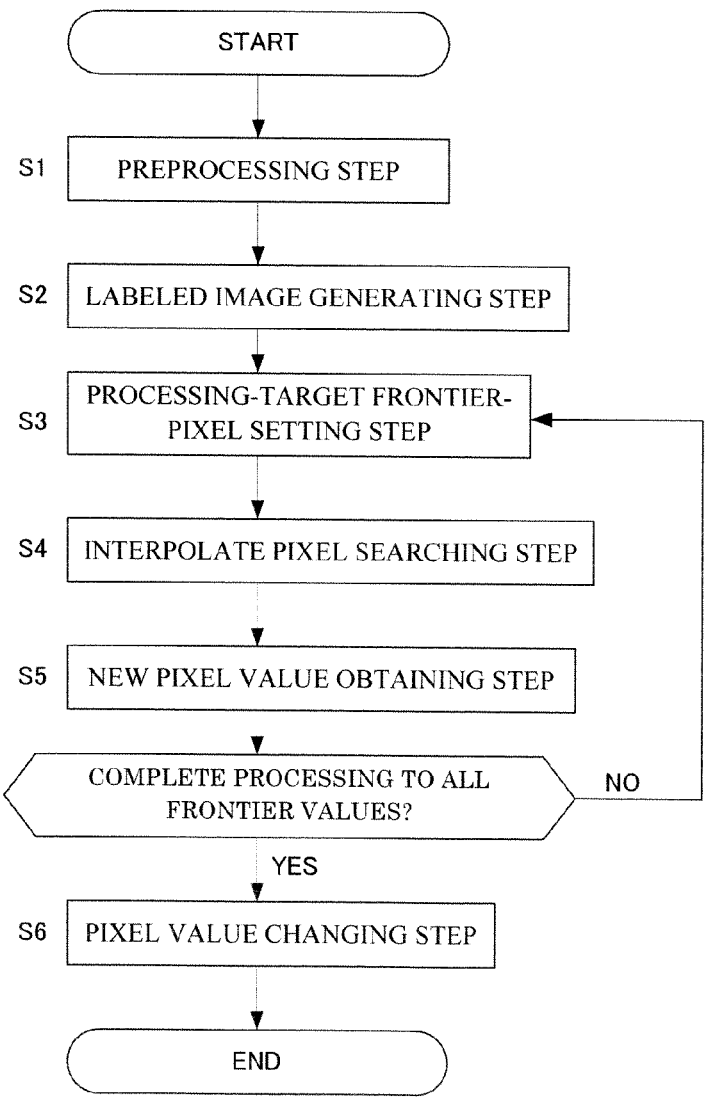

FIG. 12 is a flow chart illustrating operation of the line connecting processor 19. As illustrated in FIG. 12, the line connecting processor 19 firstly performs preprocessing to the extraction image P7 to prepare the following image processing (preprocessing step S1). Then, the line connecting processor 19 puts pixel labels to the pixels constituting the extraction image P7 to generate a labeled image Q1 (labeled image generating step S2). Thereafter, the line connecting processor 19 takes one of the frontier pixels F in the labeled image Q1 with the labels representing the pixels constituting the linear configuration as a processing target (processing-target frontier-pixel setting step S3), and searches interpolate pixels IP for a frontier pixel of the processing target (interpolate pixel searching step S4). Then, a new pixel value to be mentioned later is obtained for each of the interpolate pixels IP (new pixel value obtaining step S5). The line connecting processor 19 repeats the interpolate pixel searching step S4 and the new pixel value obtaining step S5 while changing the frontier pixel F of the processing target. Finally, the line connecting processor 19 changes the pixel values of the interpolate pixels IP to generate a fragment eliminated image P8 (pixel value changing step S6). The following describes details of these steps in order.

<Preprocessing Step S1>

Firstly, the line connecting processor 19 reads out a set value from the storing unit 28, and changes a pixel value of a portion in the extraction image P7 whose absolute value is lower than the set value so as to be further lower than the absolute value while a numeral thereof is not reversed. Specifically, the pixel value is set to 0. Accordingly, noises or a fine figure of the subject is eliminated from the extraction image P7, whereby a simplified extraction image P7a with a more noticeable linear configuration is obtainable. This achieves simplification of the following image processing.

<Labeled Image Generating Step S2>

Next, the line connecting processor 19 classifies each of the pixels in the simplified extraction image P7a under two types, and obtains a label representing the type for each of the pixels. That is, the line connecting processor 19 reads out a threshold from the storing unit 28, and classifies a pixel whose absolute value is higher than the read threshold as a frontier pixel F, and a pixel whose absolute value is lower as a non-frontier pixel N. Here, the frontier pixel F corresponds to the start point to be subjected to the line connection. The line connecting processor 19 determines a pixel from pixels in the extraction image P7 (simplified extraction image P7a) whose pixel value is equal to or higher than the threshold as the frontier pixel F.

Figure 13:
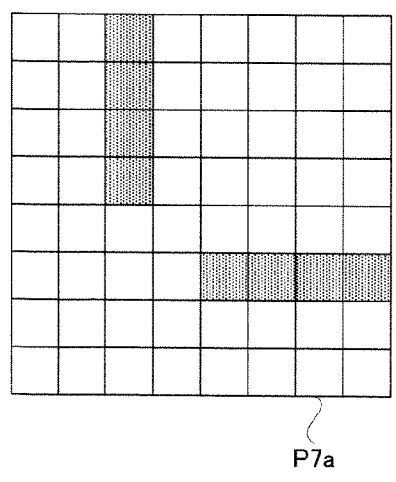
Figure 13:
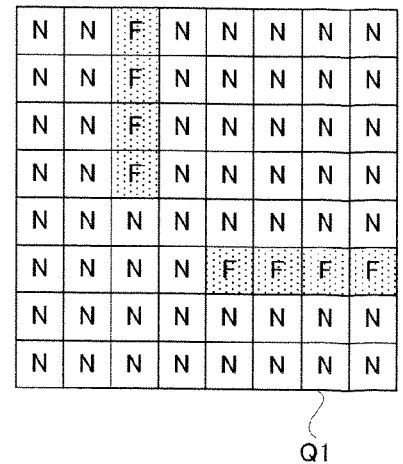

FIG. 13 illustrates how the line connecting processor 19 performs classification to each of the pixels in the simplified extraction image P7a and generates the labeled image Q1 that represents distribution of the classification. The pixels in the simplified extraction image P7a each having a lower absolute value of the pixel value is regarded as a non-frontier pixel N, whereas the pixels each having a higher absolute value of the pixel value is regarded as a frontier pixel F. Subsequently, the line connecting processor 19 continuously performs the same processing to each of the frontier pixels F. In FIG. 13, the simplified extraction image P7a contains eight dark pixels (pixels with a high absolute value of the pixel value). Accordingly, the line connecting processor 19 repeats the steps S4 and S5, to be mentioned later, eight times.

<Processing-Object Frontier-Pixel Setting Step S3>

Figure 14:
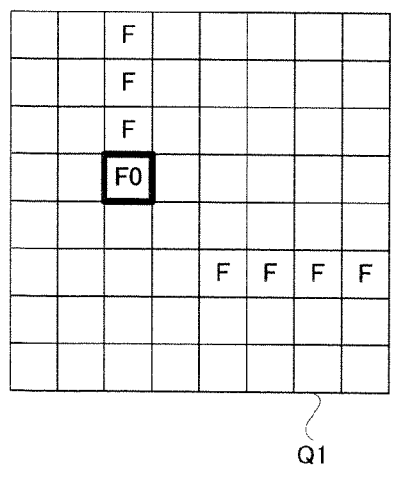
Figure 14:
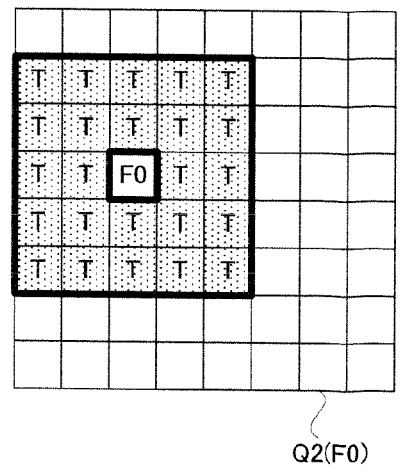

The line connecting processor 19 refers to the labeled image Q1 to select a frontier pixel F of the processing target to be subjected to the image processing. FIG. 14 denotes the selected frontier pixel F by a numeral F0.

<Interpolate Pixel Searching Step S4: Setting of Candidate Pixel T>

Next, the line connecting processor 19 start searching for an interpolate pixel IP0 that interpolates pixel values. Here, the interpolate pixel IP0 is a pixel whose pixel value is to be changed. The interpolate pixel IP0 is located between the frontier pixel F0 and an end point pixel G0 to be obtained. The frontier pixel F0 corresponds to the start point when the line connecting processor 19 connects the fragments of the line in the simplified extraction image P7a. In addition, the end point pixel G0 corresponds to the end point when the line connecting processor 19 connects the fragments of the line in the simplified extraction image P7a. That is, the line connecting processor 19 connects the fragments of the line configuration by adding a line. Here, the line has the frontier pixel F0 as the start point and the end point pixel G0 as the end point in the extraction image P7. Firstly, the following describes an approach of obtaining the end point pixel G0. This is because the interpolate pixel IP0 cannot be searched for without determining the end point pixel G0.

FIG. 14 illustrates how the line connecting processor 19 specifies a candidate pixel T as a candidate of the end point pixel G0. The line connecting processor 19 set a square region with the frontier pixel F0 as the center thereof, and sets all the pixels within the area as candidate pixels T. However, the frontier pixel F0 itself is except from the candidate pixels T. The positions of the candidate pixels T in the simplified extraction image P7a are maintained in a candidate pixel mapping image Q2 (F0). For instance, the square region preferably has a size of 5 by 5 pixels.

In the Embodiment 1, all the pixels in the square region with the frontier pixel F0 as the center thereof are not necessarily set as the candidate pixels T. That is, the line connecting processor 19 may set only the frontier pixel F in the square region as the candidate pixel T.

<Determination of Interpolate Pixel Searching Step S4: Determination of Candidate Pixel T>

The line connecting processor 19 firstly determines a candidate pixel T0 as a target to be determined among the candidate pixels T, and then determines whether or not the pixel corresponds to the end point pixel G0. Taking into consideration that FIG. 14 illustrates on the right thereof 24 candidate pixels T, the line connecting processor 19 repeats the determination for 24 times.

Figure 15:
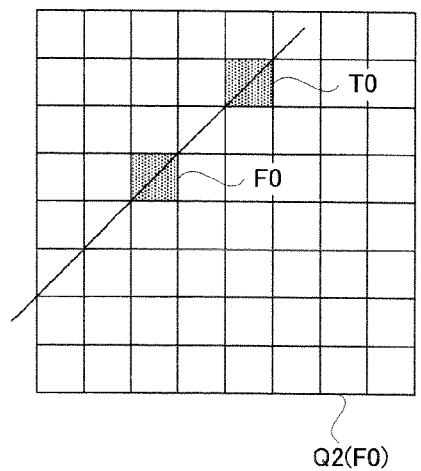
Figure 15:
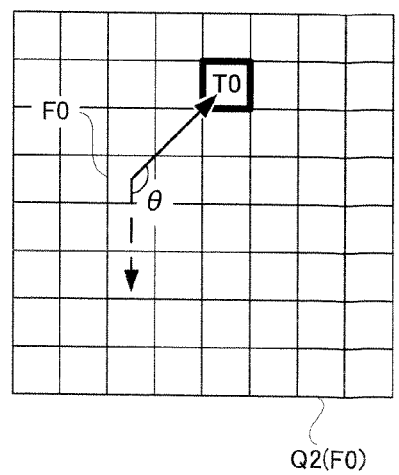

FIG. 15 illustrates how the candidate pixel T0 is determined to correspond to the end point pixel G0. The line connecting processor 19 obtains an extending direction of a line segment as a vector, the line segment passing the center of the frontier pixel F0 and the center of the candidate pixel T0. Specifically, the line connecting processor 19 reads out a vector from the storing unit 28. Here, the vector corresponds to a positional relationship between the frontier pixel F0 and the candidate pixel T0. That is, the storing unit 28 prepares tables associated with the positional relationship of the pixels and the vector. Here, the vector is referred to as a pixel arrangement direction vector for distinguishing the explanation. FIG. 15 illustrates on the right thereof the pixel arrangement direction vector by a solid line. The pixel arrangement direction vector extends from the frontier pixel F0 as the start point toward the candidate pixel T0.

The line connecting processor 19 refers to the direction image P5 stored in the storing unit 28 to determine what vector is assigned to the frontier pixel F0. The direction image P5 is an image with arranged vectors each associated with the pixel. A direction of the vector represents a direction for each pixel in which the linear configuration extends in the original image P0. The vector is referred to as a configuration extending direction vector for distinguishing the explanation. FIG. 15 illustrates on the right thereof the configuration extending direction vector by a dotted line. That is, the configuration extending direction vector is a vector having the frontier pixel F0 contained in the linear configuration in the image as the start points and extending to a direction of the configuration extending.

The line connecting processor 19 obtains an angle θ which the pixel arrangement direction vector forms with the configuration extending direction vector. A relationship between the obtained angle θ and the position of the candidate pixel T0 is held in the angle mapping image Q3 (F0). See the left of FIG. 17. The angle θ is originally an angle which two vectors form, each of the vectors having the frontier pixel F as the starting point. However, the angle θ mapped in the angle mapping image Q3 is not located at the same position as that of the frontier pixel F in the angle mapping image Q3, but at the same position as that of the candidate pixel T. This should be considered for understanding the present invention. For instance, the angle θ located on the same position as the candidate pixel T1 illustrated on the left of FIG. 17 by a hatched frame is for the candidate pixel T1 obtained by the operation illustrated with FIG. 16.

Figure 16:
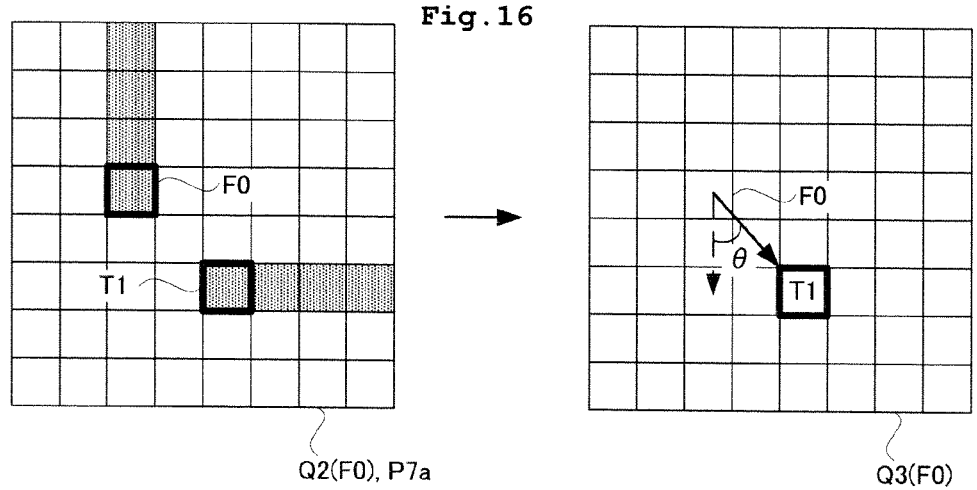
Figure 17:
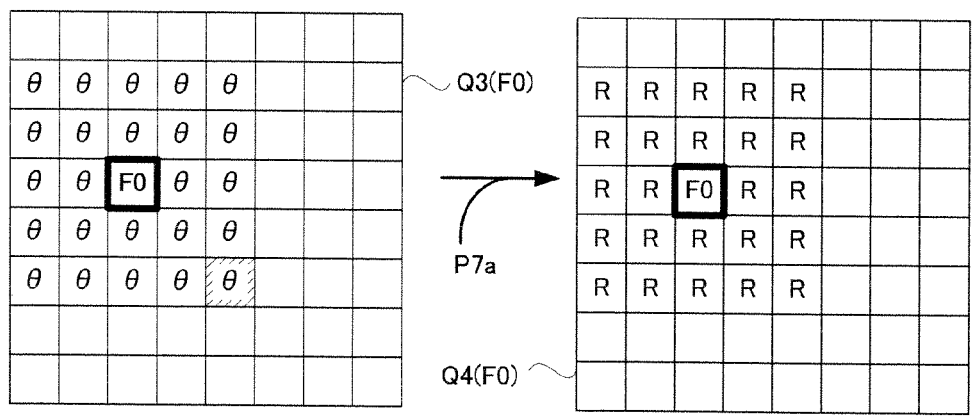

The angle θ has a significant property. That is, when the angle θ is sufficiently small, it is determined that the candidate pixel T corresponds to the end point pixel G. This is to be described in detail. FIG. 16 illustrates how the line connecting processor 19 determines the candidate pixel T1 contained in the dark line in the simplified extraction image P7a. A direction of the pixel arrangement direction vector in the candidate pixel T1 conforms to a direction of the candidate pixel T1 seen from the frontier pixel F0. That is, the direction is a diagonally lower right direction. On the other hand, a direction of the configuration extending direction vector in the candidate pixel T1 conforms to the extending direction of the linear configuration containing the frontier pixel F0. That is, the direction is a downward direction.

FIG. 16 illustrates an example that the direction of the pixel arrangement direction vector does not conform to the direction of the configuration extending direction vector. However, it is assumed here for an extreme example that both the directions conform to each other. At this time, adding a line between the frontier pixel F0 and the candidate pixel T1 ensures to obtain enhanced visibility of the simplified extraction image P7a. The following describes the reason for this. The line connecting processor 19 operates to add a line to the simplified extraction image P7a so as to connect the frontier pixel F with the end point pixel G. It is assumed that the candidate pixel T1 in the example of FIG. 16 is located below the frontier pixel F0 and a line is added between the frontier pixel F0 and the candidate pixel T1. Then, an extending direction of the added line conforms to the direction of the pixel arrangement direction vector. That is, the direction is a downward direction. On the other hand, the frontier pixel F0 is a part of the linear configuration extending vertically. This is because the vector of the frontier pixel F0 in the configuration extending direction is directed downwardly. That is, adding the line achieves further downward extension of the linear configuration extending downwardly. In this manner, adding the line so as to hold the extending direction of the linear configuration allows obtainment of a more natural and high-visibility image.

The description is continuously performed under an assumption that the angle θ in the candidate pixel T1 is sufficiently small. The line connecting processor 19 reads out the angle θ from the angle mapping image Q3 (F0) generated as in FIG. 17, and reads out a pixel value from the simplified extraction image P7a to obtain a connection confidence value R. The connection confidence value R represents whether each of the candidate pixels T is suitable for the line connection. That is, a connection confidence value R for a candidate pixel T is calculated from an angle θ and a pixel value of the candidate pixel T. Specifically the connection confidence value R is calculated by multiplying a term representing smallness of the angle θ and a term representing a magnitude of an absolute value of the pixel value. Consequently, the connection confidence value R increases as the angle θ becomes small, and increases as the absolute value of the pixel value becomes high. A relationship between the obtained connection confidence value R and the position of the pixel is held in a connection confidence value mapping image Q4 (F0). See the right of FIG. 17.

The connection confidence value R increases as the angle θ becomes small. This is because the extending direction of the linear configuration conforms to the extending direction of the line to be added, which has been already mentioned. The following describes why the connection confidence value R is set high as the absolute value of the pixel value increases. When the simplified extraction image P7a contains noticeable fragments of the linear configuration, the fragments are prominent upon visually identifying the image. The noticeable linear configuration in the simplified extraction image P7a is extremely light or dark. Consequently, preferential line connection is required to the linear configuration constituted by the pixels having extremely low or high pixel values. Specifically, the connection confidence value R increases as the absolute value of the pixel value becomes high.

Figure 18:
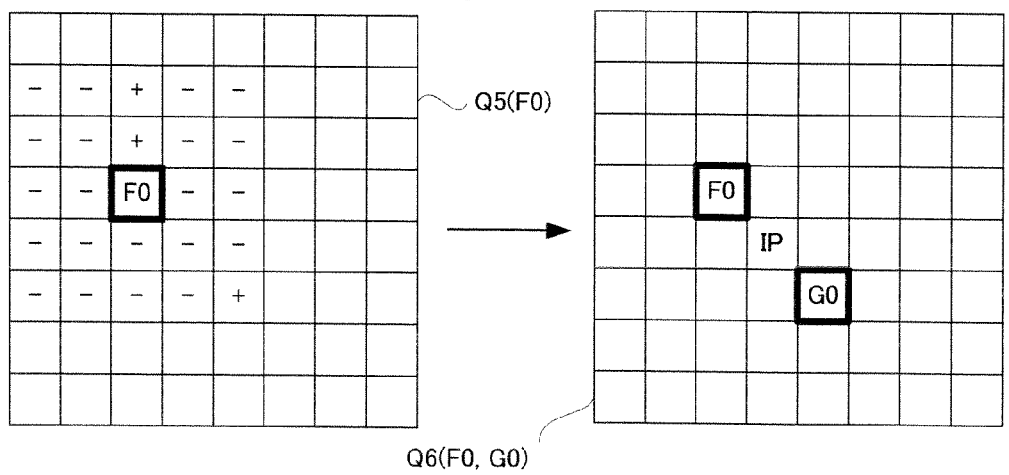

The line connecting processor 19 reads out the set value from the storing unit 28. When the connection confidence value R of the candidate pixel T is equal to or more than a certain value, the candidate pixel T is used as a processing target for the following line connection. When the connection confidence value R of the candidate pixel T is less than the certain value, the line connecting processor 19 does not use the candidate pixel T as a processing target for the following line connection. FIG. 18 illustrates on the left thereof a candidate pixel T for the line connection processing target by a numeral + (plus), and a candidate pixel T not for the line connection processing target by a numeral − (minus). The evaluation result using the connection confidence value R is held in a connection confidence value mapping image Q5 (F0).

As noted above, the line connecting processor 19 obtains a direction connecting the candidate pixel T with a frontier pixel F set in advance when the end point pixel G is determined from the candidate pixels T in the extraction image. In addition, the line connecting processor 19 obtains the extending direction of the linear configuration containing the candidate pixel T from the direction image P5. Accordingly, the line connecting processor 19 specifies a candidate pixel T as the end point pixel G preferentially, the candidate pixel T being determined to have high degree of conformance of the obtained two directions.

Moreover, the line connecting processor 19 obtains an absolute value of the pixel value of the candidate pixel T from the extraction image P7 (simplified extraction image P7a) upon determining the end point pixel G from the candidate pixels T in the extraction image. Accordingly, the line connecting processor 19 preferentially specifies the candidate pixel T determined to have a high absolute value of the pixel value as an end point pixel G.

The line connecting processor 19 determines the candidate pixel T to be subjected to the line connection as the end point pixel G for the line connection based on the connection confidence value R. The following describes operation of the line connecting processor 19 to the end point pixel G0.

<Interpolate Pixel Searching Step S4: Identification of Interpolate Pixel IP>

As illustrated in FIG. 18, the line connecting processor 19 identifies a pixel through which the line connecting the frontier pixel F0 with the end point pixel G0 passes as an interpolate pixel IP. Here, the frontier pixel F is except from the interpolate pixel IP. The position of the interpolate pixel IP in the simplified extraction image P7a is held in an interpolate pixel mapping image Q6 (F0, G0). FIG. 18 illustrates only one interpolate pixel IP since the frontier pixel F0 is away from the end point pixel G0 by one pixel. On the other hand, as illustrated on the left of FIG. 19, when the frontier pixel F and the end point pixel G concerning identification of the interpolate pixel IP are away from each other, more interpolate pixels IP are to be identified. The line connecting processor 19 achieves the line connection by changing the pixel value of the interpolate pixel IP. That is, the line connecting processor 19 performs the line connection by changing the pixel value of the pixel between the frontier pixel F and the end point pixel G.

<New Pixel Value Obtaining Step S5>

The following describes in detail a pixel value to which the pixel value of the interpolate pixel IP is changed. The line connecting processor 19 calculates a changed pixel value in accordance with a positional relationship of the interpolate pixel IP, the frontier pixel F0, and the end point pixel G. Here, the changed pixel value to be determined by the line connecting processor 19 is referred to as a new pixel value n.

Figure 19:
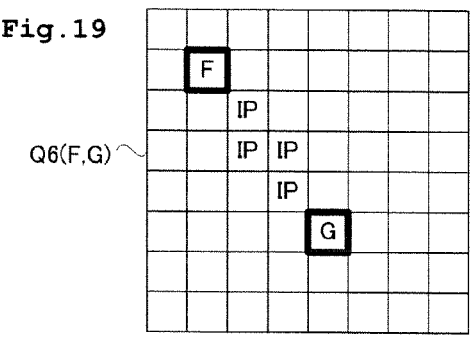
Figure 19:
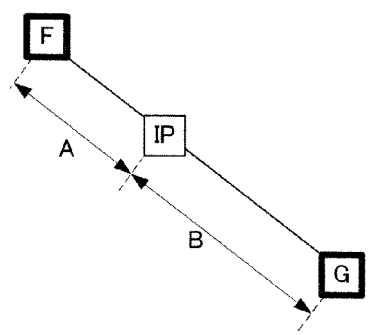

FIG. 19 illustrates on the right thereof an approach of determining the new pixel value n of the interpolate pixel IP. The line connecting processor 19 determines a distance A from the center of the frontier pixel F to the center of the interpolate pixel IP and a distance B from the center of the interpolate pixel IP and the center of the end point pixel G0. Next, the line connecting processor 19 reads out pixel values of the frontier pixel F and the end point pixel G0 from the simplified extraction image P7a. Then, the line connecting processor 19 adds weights to the pixel values based on the distances A, B to obtain the new pixel value n. Specifically, assuming that a pixel value of the frontier pixel F is Vf and a pixel value of the end point pixel G is Vg, the new pixel value n is given by the following. Here, the new pixel value n corresponds to the changed pixel value in the present invention.

$$n = Vf \cdot B/(A+B) + Vg \cdot A/(A+B)$$

That is, the line connecting processor 19 calculates the distance A between the frontier pixel F and the pixel of the processing target subjected to pixel value changing processing and the distance B between the end point pixel G and the pixel of the processing target subjected to pixel value changing processing upon determining the new pixel value n prior to changing the pixel values. Accordingly, the line connecting processor 19 determines the new pixel value n so as to approach a pixel value of either the frontier pixel F or the end point pixel G not farther but closer to the interpolate pixel IP of the processing target subjected to the pixel value changing processing.

Figure 20:
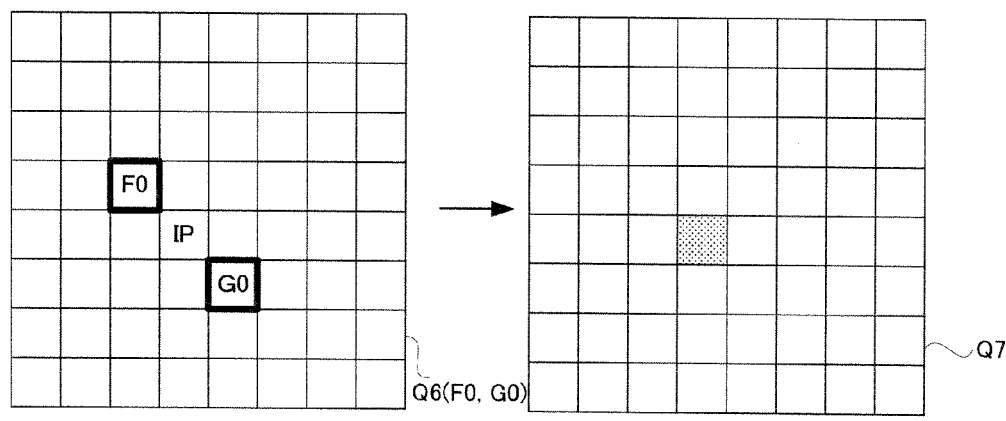

A relationship between the new pixel value n and positions of the pixels is held in a new pixel value mapping image Q7. FIG. 20 illustrates how the new pixel value mapping image Q7 is generated from the interpolate pixel mapping image Q6 (F0, G0).

<Pixel Value Changing Step S6>

Figure 21:
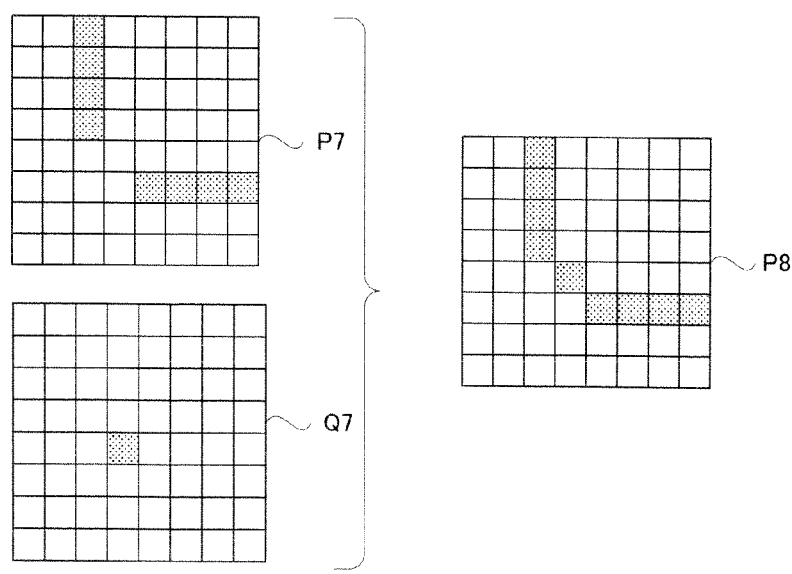

FIG. 21 illustrates how the line connecting processor 19 performs the line connection by changing the pixel values in the extraction image P7. Specifically, the line connecting processor 19 identifies a position of a new pixel-value calculated pixel in the new pixel value mapping image Q7 with the new pixel value n calculated, thereby identifying a pixel in the extraction image P7 at the same position as the pixel. Then, the line connecting processor 19 changes the pixel value of the pixel identified in the extraction image P7 to a pixel value of the new pixel-value calculated pixel at the same position. In this manner, as illustrated in FIG. 21, the line connection is performed to the extraction image P7 to generate a fragment eliminated image P8. On the other hand, the line connecting processor 19 performs no change to a pixel value of the pixel in the extraction image P7 at the same position as the new pixel-value non-calculating pixel with no pixel value n calculated in the new pixel value mapping image Q7.

<Repeat of Operation>

Figure 22:
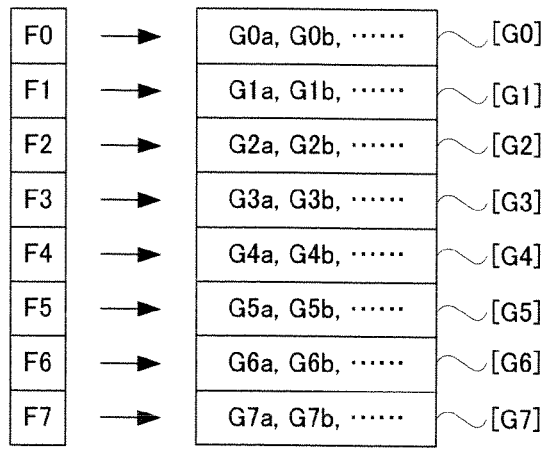

The above describes operation of one pixel F0 of eight frontier pixels F in the simplified extraction image P7a. The line connecting processor 19 performs similar operation to the other frontier pixels F1 to F7. That is, identification of the candidate pixel T described with FIG. 14 is performed eight times for the frontier pixels F0 to F7, and identification of the end point pixel G described with FIGS. 15 to 18 is performed eight times for the frontier pixel F0 to F7. Accordingly, a plurality of end point pixels G is identified. Specifically, as illustrated in FIG. 22, the frontier pixels F0 to F7 contain end point pixel groups [G0] to [G7], respectively.

Figure 23:
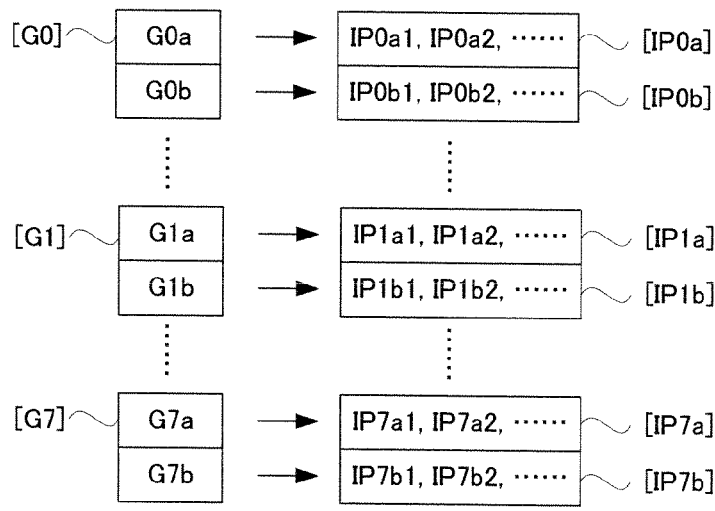

Then the line connecting processor 19 pairs the frontier pixel F0 with any of end point pixels G0a, G0b, . . . in the corresponding end point pixel group [G0] to identify an interpolate pixel IP. For instance, with five end point pixels G0 for the frontier pixel F0, the line connecting processor 19 repeats the operation described in FIGS. 19 and 20 five times. Accordingly, a plurality of interpolate pixels IP is identified. In this manner, the end point pixels G0a, G0b, . . . are identified with the corresponding interpolate pixel groups [IP0a], [IP0b], . . . , respectively, as illustrated in FIG. 23. Upon completing identification of the interpolate pixel IP for the frontier pixel F0, the line connecting processor 19 continuously identifies an interpolate pixel IP for the other frontier pixels F1 to F7. As a result, a condition of identifying the interpolate pixel groups [IP0a], [IP0b], . . . , for each end point pixel G is similar to that of the end point pixel groups [G1] to [G7] corresponding to the other frontier pixels F1 to F7, respectively.

<Overwriting New Pixel Value n Upon Generating New Pixel Value Mapping Image>

It may be considered from the above that significantly many interpolate pixels IP are identified in the simplified extraction image P7a. However, it is not so in actual. This is because repeating the interpolate pixel searching step S4 by the line connecting processor 19 causes identification of the pixel at the same position in the simplified extraction image P7a as the interpolate pixel IP many times. The line connecting processor 19 calculates a new pixel value n for every identification of the interpolate pixel IP. Accordingly, a plurality of new pixel values n is calculated for the pixel at the same position in the simplified extraction image P7a. As a result, changing the pixel value described with FIG. 21 possesses a problem which of the new pixel values n is to be used.

Figure 24:
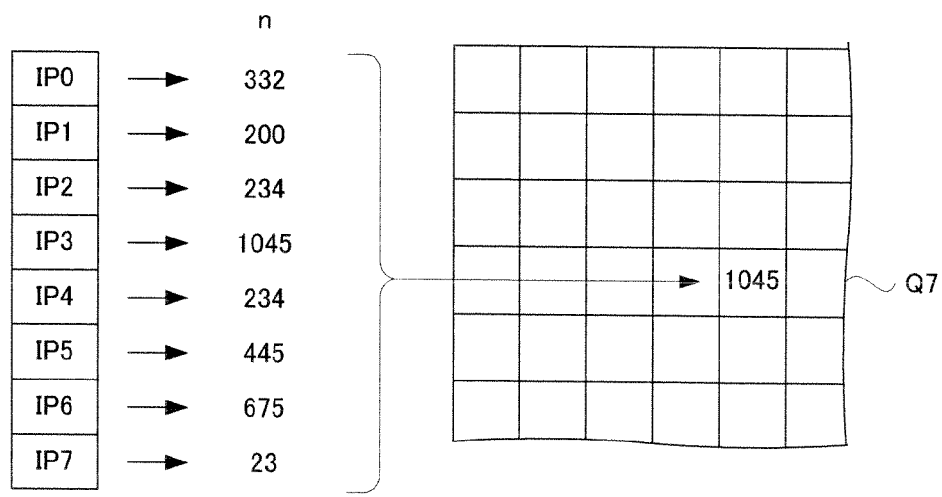

With the construction of Embodiment 1, the above problem is overcome by overwriting a value in the new pixel value mapping image Q7. FIG. 24 illustrates how to overwrite the value in the new pixel value mapping image Q7. FIG. 24 illustrates a case that the pixel at the same position in the simplified extraction image P7a is redundantly identified as the interpolate pixels IP0 to IP7 as the line connecting processor 19 repeats the operation. The line connecting processor 19 calculates a new pixel value n for every identification of the interpolate pixels IP0 to IP7. Accordingly, a corresponding number of new pixel values n exists for the interpolate pixels IP0 to IP7. The line connecting processor 19 repeats overwriting such that a new pixel value n with a high absolute value remains in the new pixel value mapping image Q7 upon generating the image. Here, such a condition is to be described with FIG. 24. Firstly, when identifying the interpolate pixel IP0, the line connecting processor 19 arranges a new pixel value 332 corresponding thereto in the new pixel value mapping image Q7. Thereafter, the line connecting processor 19 identifies the interpolate pixels IP1 and IP2 in turn. Since the new pixel values calculated at this time are each less than 332, the new pixel value mapping image Q7 is not changed. When the line connecting processor 19 identifies the interpolate pixel IP3, a new pixel value 1045 is calculated, which is more than the new pixel value 332 in the new pixel value mapping image Q7. Then, the line connecting processor 19 overwrites the new pixel value n with 1045. Thereafter, the line connecting processor 19 identifies the interpolate pixels IP4 to IP7 in turn. Since the calculated new pixel values are each less than 1045, the new pixel value mapping image Q7 is not changed.

That is, when a plurality of new pixel values n are calculated at the same position in the extraction image P7 (simplified extraction image P7a) upon determining the new pixel value n prior to changing the pixel value, the line connecting processor 19 uses a pixel value with a higher absolute value for changing processing. Consequently, the final new pixel value n is invariable with an order of identifying the interpolate pixels IP0 to IP7.

FIG. 24 illustrates how to change the pixel value in the new pixel value mapping image Q7 into any pixel value in the interpolate pixel IP. However, the line connecting processor 19 does not always change the pixel value as illustrated in FIG. 24 actually. Specifically, the line connecting processor 19 compares the pixel value of the interpolate pixel IP having the maximum absolute value to the pixel value of the pixel at the same position as the interpolate pixel IP in the simplified extraction image P7a. Then, when the absolute value of the pixel value of the pixel in the simplified extraction image P7a is higher than that in the interpolate pixel IP, the line connecting processor 19 does not set a new pixel value n at the same position in the new pixel value mapping image Q7. By such operation, the line connecting processor 19 excepts a pixel from a target subjected to pixel change along with the line connection, the pixel having a high absolute value of the pixel value in the simplified extraction image P7a.

Figure 25:
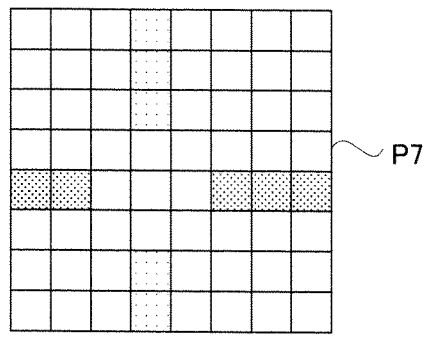

The following describes an effect of updating the new pixel value mapping image Q7 as noted above. Now considered is the extraction image P7 as illustrated in FIG. 25. The extraction image P7 contains two vertical and horizontal linear configurations. The extraction image P7 lacks a portion where the two linear configurations intersect, and thus two linear configurations are broken at the portion. The line connection is performed to such an extraction image P7 as above.

Figure 26:
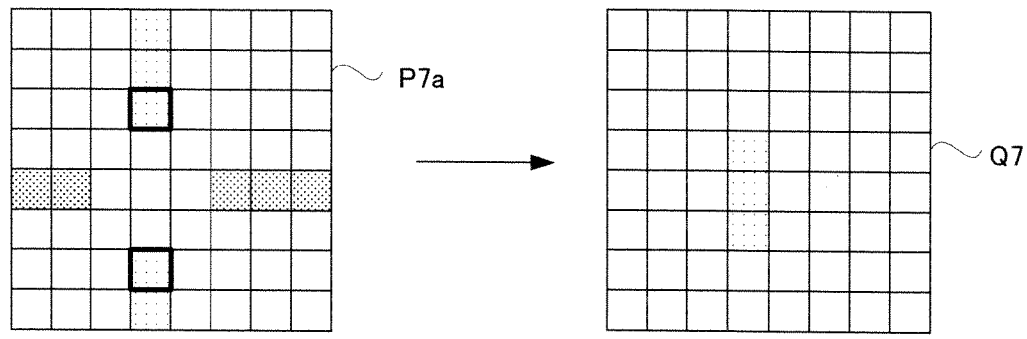

FIG. 26 illustrates how to generate the new pixel value mapping image Q7 based on the simplified extraction image P7a obtained by simplifying the extraction image P7 in FIG. 25. FIG. 26 illustrates midstream generation of the new pixel value mapping image Q7. Accordingly, the new pixel value mapping image Q7 in the drawing is not completed. FIG. 26 illustrates a condition in which the interpolate pixel IP is searched for two pixels surrounded with thick lines on the left thereof. Accordingly, one of the two pixels surrounded with the thick lines corresponds to the frontier pixel F, and the other corresponds to the end point pixel G. The line connecting processor 19 identifies three vertical pixels sandwiched by the two pixels as the interpolate pixels 1P, and calculates the new pixel value n. At this time, the calculated new pixel value n has a value approximate to the pixel values of the two pixels surrounded by the thick lines on the left of the drawing. This is because the new pixel value n is calculated based on the frontier pixel F and the end point pixel G. The condition of actually calculating the new pixel value n has been already described with FIG. 19.

Figure 27:
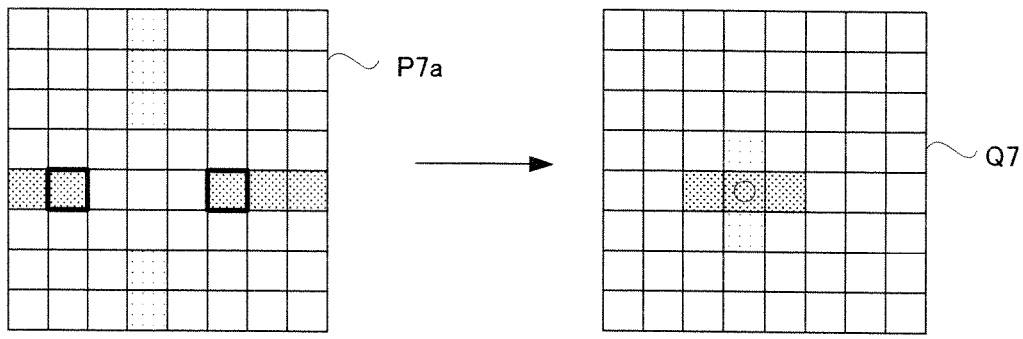

FIG. 27 illustrates a condition in which the line connecting processor 19 performs further image processing. In FIG. 27, the interpolate pixel IP is searched for two pixels surrounded by thick lines on the left thereof. Accordingly, one of the two pixels surrounded by the thick lines corresponds to the frontier pixel F, and the other corresponds to the end point pixel G. The line connecting processor 19 identifies three horizontal pixels sandwiched by the two pixels as the interpolate pixels IP, and calculates the new pixel value n. At this time, the calculated new pixel value n has a value approximate to the pixel values of the two pixels surrounded by the thick lines on the left of the drawing.

Now focus on a pixel in FIG. 27 indicated by a round in the new pixel value mapping image Q7. The new pixel value n in the pixel is calculated twice. Specifically, the new pixel value n are calculated by both the first processing described with FIG. 26 and the second processing described with FIG. 27. Upon comparison of absolute values of the two new pixel values n, an absolute value of the new pixel value n calculated by the first processing is higher than that by the first processing. Consequently, it is found that the line connecting processor 19 overwrites the new pixel value n for the pixel with the round at the second processing. The new pixel value mapping image Q7 is finished with the condition of FIG. 27.

Figure 28:
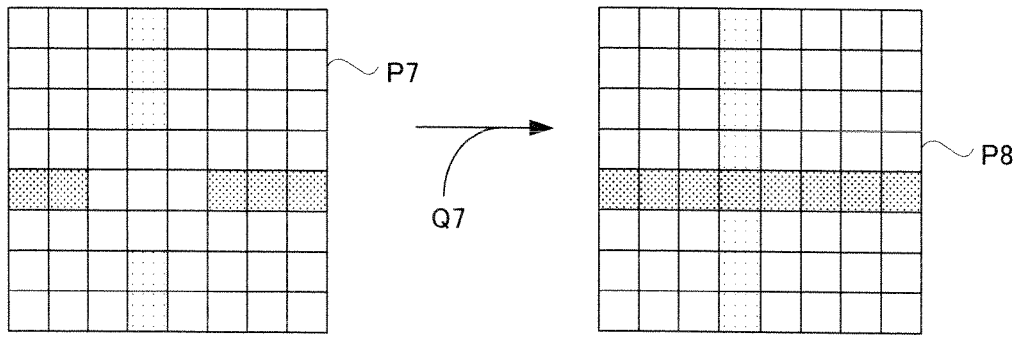

FIG. 28 illustrates how the line connecting processor 19 changes the pixel value using the new pixel value mapping image Q7 finished through the above processing. Referring the generated fragment eliminated image P8 determines the following. That is, the darker one of the two linear configurations in the extraction image P7 that extends horizontally is preferentially connected. The linear configurations noticeable in the extraction image P7 is extremely lighter or darker than the surroundings. With the Embodiment 1, contriving the overwriting of the new pixel value n achieves a fragment eliminated image P8 with the fragments of the linear configuration noticeable in the extraction image P7 being connected naturally.

<Operation of Superimposed Image Generating Section>

The superimposed image generating unit 20 weights the fragment eliminated image P8 on the original image P0 to generate a superimposed image P9. The operation of the image processing apparatus 1 is completed at this time. The fragment eliminated image P8 contains the linear configuration in the original image P0 with maintained contrast. In addition, the fragments of the linear configuration are naturally connected by the line connection. Consequently, superimposing the fragment eliminated image P8 on the original image P0 allows generation of the superimposed image P9 with high visibility.

<Other Effect of Line Connecting Processor>

As noted above, the line connecting processor 19 connects the fragments of the linear configuration in the extraction image P7. This enhances visibility of the superimposed image P9. The line connecting processor 19 also enhances the visibility of the superimposed image P9 from another different reason. The following describes another different effect of Embodiment 1.

Figure 29:
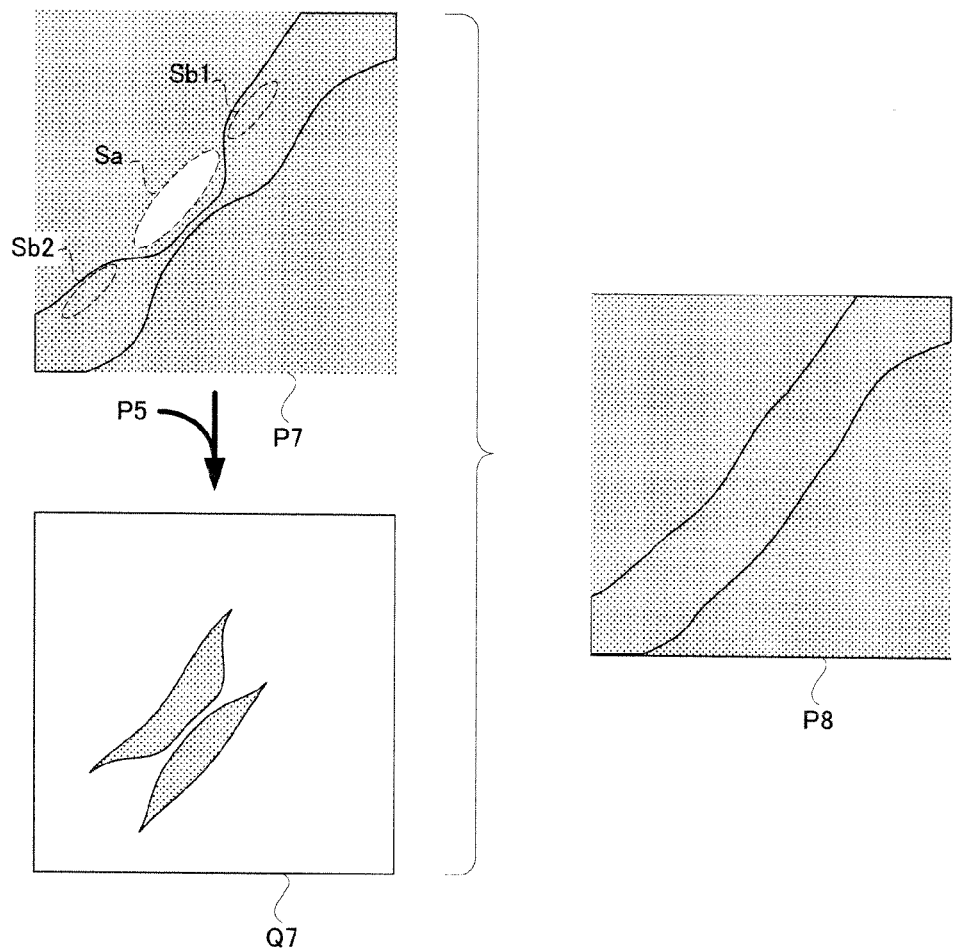

Now an extraction image P7 as in FIG. 29 is to be considered. The extraction image P7 contains a linear configuration extending diagonally. However, the linear configuration has various thicknesses for its sites. That is, the linear configuration should be extracted with even thickness normally. However, the linear configuration is extracted while being partially constricted due to noises or the like. When the extraction image P7 with such a condition is superimposed on the original image P0, the superimposed image P9 with high visibility is not obtainable. This is because the linear configuration contained in the superimposed image P9 has various thicknesses, and thus the image is unnatural.

FIG. 29 illustrates a new pixel value mapping image Q7 generated based on the extraction image P7. Specifically, the new pixel value mapping image Q7 has new pixel values n arranged so as to backfill a constricted portion of the linear configuration in the extraction image P7. A constricted portion Sa is between portions Sb1, Sb2 of the linear configuration. Consequently, pixels constituting the constricted portion Sa are identified as interpolate pixels IF in the interpolate pixel searching step S4.

Then, pixel values are changed using the new pixel value mapping image Q7 generated in this manner. Accordingly, a fragment eliminated image P8 is generated containing the linear configuration with even thickness as illustrated in FIG. 29. Superimposing this fragment eliminated image P8 on the original image P0 allows generation of the superimposed image P9 with high visibility.

As noted above, the foregoing embodiment achieves image processing that highlights the linear configuration in the original image. Specifically, the linear configuration in the original image P0 is identified by two approaches. The first approach is to generate the evaluation image P3 for evaluating whether or not each of the pixels corresponds to the linear configuration in the original image. This achieves positional identification of the linear configuration in the original image. The second approach is to generate the difference image P6 with the linear configuration appearing therein. The difference image P6 is obtained by calculating difference in pixel value between the linear configuration and a portion other than the linear configuration in the original image P0. This allows determination of difference in pixel value of the linear configuration from the portion other than the linear configuration in the original image P0. Here, the evaluation image P3 merely contains positional information on the linear configuration in the original image P0. On the other hand, the difference image P6 contains a false image derived from differential processing for direction to the entire original image P0. Accordingly, extracting the linear configuration using the two images with such the demerits allows compensation for the demerits of the two approaches each other. Consequently, the obtained extraction image P7 contains the linear configuration extracted from the original image P7 with maintained contrast, and thus has high visibility.

In addition, the above embodiment further includes the line connecting processor 19 configured to connect the fragments of the linear configuration in the extraction image P7 to generate the fragment eliminated image P8. The line connecting processor 19 interpolates pixels in the extending direction of the linear configuration in the extraction image P7 based on the direction image P5 while obtaining the extending direction of the linear configuration in the extraction image P7. Accordingly, the linear configuration is expanded in its extending direction. Such operation causes natural connection of the fragments of the linear configuration in the extraction image P7, achieving provision of the fragment eliminated image P8 with higher visibility.

Moreover, the line connecting processor 19 specifies a pixel having a pixel value whose absolute value is threshold or more as the start point pixel when selecting the frontier pixel F from the pixels in the extraction image. This ensures the line connection to the linear configuration noticeable in the extraction image.

Moreover, the line connecting processor 19 obtains the direction of connecting the candidate pixel T of the end point pixel G as the end point of the line connection with the frontier pixel F set in advance. In addition, the line connecting device obtains the extending direction of the linear configuration containing the frontier pixel F from the direction image P5, and preferentially determines one of the candidate pixels T as the end point pixel G, the one being determined having the highest degree of coincidence of the two obtained directions. This allows suitable selection of the end point pixel G from the candidate pixels T. When the linear configuration extends from the frontier pixel F to the candidate pixel T having been determined to have the highest degree of coincidence of the two obtained directions, the linear configuration is expanded in its extending direction. In other words, performing the line connection based on the above determination allows more natural connection of the linear configuration.

Moreover, as described in Embodiment 1, the candidate pixel T having been determined to have a high absolute value of the pixel is preferentially determined as the end point pixel G, ensuring the line connection to the linear configuration noticeable in the extraction image.

Moreover, the pixel values of the pixels between the frontier pixel F and the end point pixel G are changed. Consequently, the line connection is completed by changing a few pixels.

The pixel value is changed during the line connection so as to approach the pixel value of either the frontier pixel F or the end point pixel G not farther from but close to a target subjected to the pixel change. Accordingly, the frontier pixel F is connected to the end point pixel G more smoothly. That is, when a variation of the pixel value between the frontier pixel F and the end point pixel G in the fragment eliminated image P8 is observed, the pixel value of the frontier pixel F gradually changes to the pixel value of the end point pixel G. In this manner, the line connection is performed while no large difference in pixel value is generated between the frontier pixel F and the end point. Consequently, the fragment eliminated image P8 with superior visibility is obtainable.

Upon determining a new pixel value n prior to changing the pixel value, the line connecting processor 19 operates to use a pixel value with a higher absolute value from a plurality of new pixel values n calculated at the same position in the extraction image. Consequently, the fragment eliminated image P8 with superior visibility is obtainable. That is, when a pixel value of a pixel located at an intersection of a dark line and a light line is changed, the line connection is preferentially performed to the dark line. In this manner, the line connecting processor 19 ensures to connect the dark line noticeable in the original image P0 to perform the line connection.

As noted above, superimposing the fragment eliminated image P8 on the original image P0 allows generation of the superimposed image P9 with superior visibility having combination of a fine configuration of the subject in the original image P0 and a clear linear configuration in the fragment eliminated image. Here, the linear configuration does not appear on the pixels in the original image whose position corresponds to a position of the pixel subjected to the line connection in the fragment eliminated image P8. Consequently, the pixels with superimposition of the pixel subjected to the line connection on the pixel in the original image P0 at the same position has a lower pixel value by a small density of the pixel in the original image. Accordingly, the above embodiment controls the absolute value of the new pixel value n to be higher. Such a construction eliminates generation of a partially-thin linear configuration in the superimposed image P9, achieving a superimposed image P9 with superior visibility.

The present invention is not limited to the above constructions, but may be modified as under.

1. In the above embodiment, the fragment eliminated image P8 contains no highlighted expanded portion of the line. Alternatively, the fragment eliminated image P8 may be generated with a highlighted expanded portion. Such construction allows generation of the superimposed image P9 with higher visibility. The following describes an improvement of the above embodiment.

Firstly, a drawback of the above embodiment is to be described. Now considered is an original image P0 as illustrated on the left of FIG. 30. The original image P0 contains one linear configuration extending horizontally and fragmented at the center of the image. When the extraction image P7 is generated based on such an original image P0, the extraction image P7 becomes similar to the original image P0. This is because the extraction image P7 is generated by merely extracting the linear configuration from the original image P0.

Figure 30:
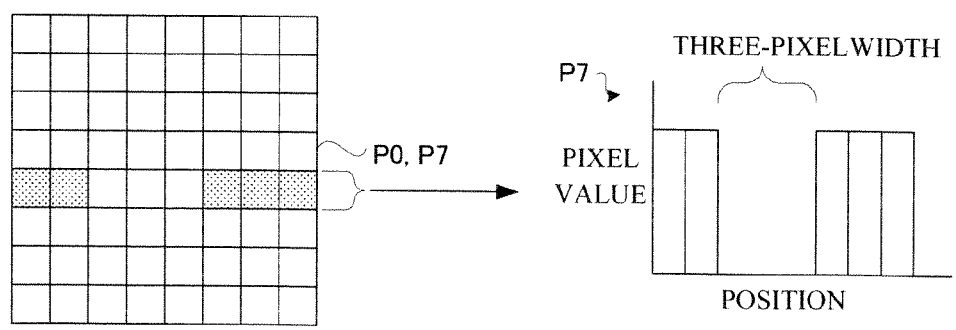
FIGS. 30 to 35 are schematic views each illustrating operation of a line connecting processor according to one modification of the present invention.

FIG. 30 illustrates on the right thereof a bar graph of a profile for a row containing the linear configuration in the extraction image P7. It is determined from the profile that there are three pixels with pixel value of 0 by a three-pixel width. Another portion in the profile corresponds to a portion containing the linear configuration in the extraction image P7, and thus has a positive pixel value.

Figure 31:
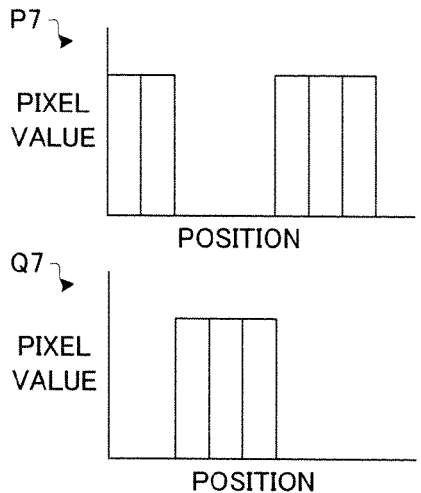
Figure 31:
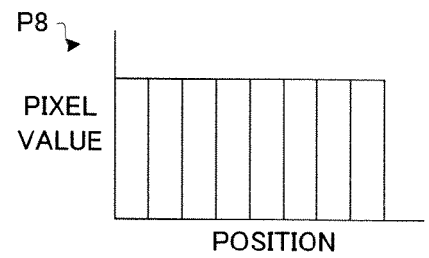

FIG. 31 illustrates a profile of generating the fragment eliminated image P8 with the embodiment above. That is, FIG. 31 illustrates a profile of the new pixel value mapping image Q7 generated based on the extraction image P7. In the new pixel value mapping image Q7, new pixel values n calculated in the new pixel value obtaining step S5 are prepared in a region with a three-pixel width and a pixel value of 0 in the extraction image P7. When the fragment eliminated image P8 is generated based on the extraction image P7 and the new pixel value mapping image Q7, the fragment eliminated image P8 contains a connected horizontal line which is fragmented in the extraction image P7. See the right of FIG. 35.

Now focus on the pixel value of the pixel in the fragment eliminated image P8 generated in FIG. 31. With the embodiment, the pixel value of the pixel in the extraction image P7 is based on the pixel value of the pixel in the new pixel value mapping image Q7. In FIG. 31, the extraction image P7 contains five pixels with an equal pixel value. Accordingly, the pixel value of the pixel in the new pixel value mapping image Q7 is same as this. For details, see the new pixel value obtaining step S5. Consequently, generating the fragment eliminated image P8 from the extraction image P7 and the new pixel value mapping image Q7 causes the fragment eliminated image P8 to contain eight pixels with an equal pixel value arranged as in the right of FIG. 35.

Figure 32:
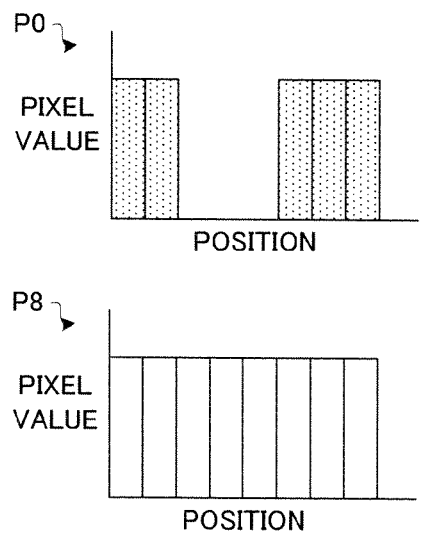
Figure 32:
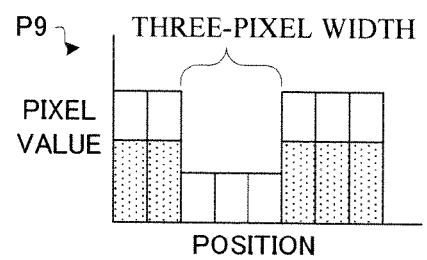

FIG. 32 illustrates a profile of generating a superimposed image P9 based on the fragment eliminated image P8 obtained in FIG. 31. Here, the profile of the original image P0 is similar to that of the extraction image P7. The profile of the original image P0 is hatched for distinction. Superimposing the original image P0 on the fragment eliminated image P8 causes generation of the superimposed image P9 having a profile as in FIG. 32.

Figure 35:
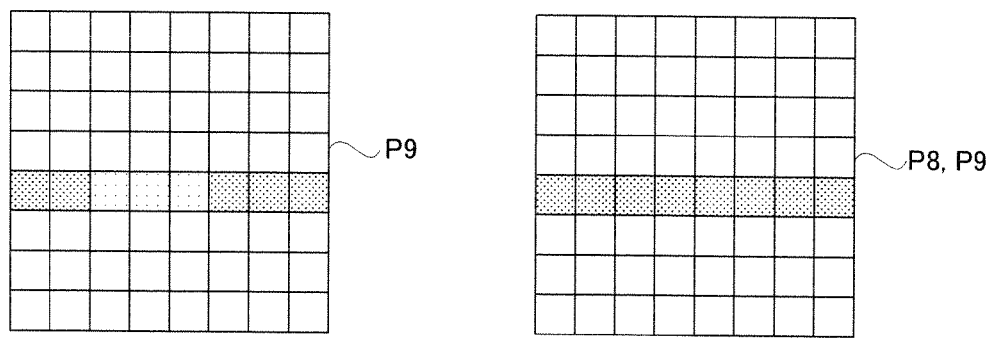

Now focus on a pixel value of the pixel in the superimposed image P9 generated in FIG. 32. The profile of the superimposed image P9 includes a recess with a three-pixel width. In other words, as illustrated in the left of FIG. 35, the superimposed image P9 contains a light region appearing in the original image P0 with a three-pixel width.

Here, it is considered how such a recess is generated in the profile of the superimposed image P9 in FIG. 32. Seen the profile of the fragment eliminated image P8 in FIG. 32, it is determined that the line connection is identically completed at this time. That is, the fragment eliminated image P8 at this time contains eight pixels arranged horizontally in one row with an equal pixel value as illustrated on the right of FIG. 35. Accordingly, a portion corresponding to an expanded portion by the line connection is not distinguishable. In contrast to this, the original image P0 contains a dark portion with the line and a light portion with fragments of the line as illustrated on the left of FIG. 30. Consequently, although the fragment eliminated image P8 is superimposed on the original image P0, the fragment eliminated image P8 cannot eliminate the light portion in the original image P0 with a three-pixel width. Accordingly, the profile of the superimposed image P9 contains the light portion with the fragments of the line in the original image P0 appearing therein as a recess with a three-pixel width. Such line connection is not identical, degrading image visibility.

Figure 33:
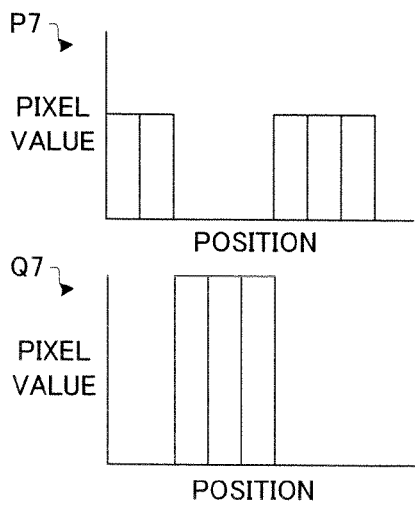
Figure 33:
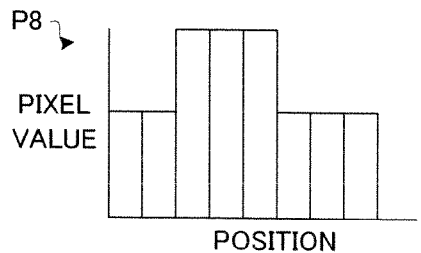

In the modification, some device is conducted upon generating the new pixel value mapping image Q7 for improving such a drawback. Specifically, when calculating pixel values in the new pixel value obtaining step S5, the line connecting processor 19 adds a given value to the new pixel value n calculated based on the frontier pixel F and the end point pixel G to adjust the new pixel value n to be lower. Accordingly, as illustrated in FIG. 33, the new pixel value mapping image Q7 has higher pixel values than those in the extraction image P7.

That is, the line connecting processor 19 determines the new pixel value n, and thereafter controls the new pixel value n so as the absolute value thereof to be more than the absolute values of the pixel values of the frontier pixel F and the end point pixel G, thereby highlighting an expanded line in the fragment eliminated image P8.

The following describes examples of calculation to the new pixel value n determined in the new pixel value obtaining step S5 for adjusting the new pixel value n to be lower. That is, a given value may be added to the new pixel value n. Alternatively, a pixel value with a high absolute value may be added to the new pixel value n with reference to the pixel value in the original image P0 at the same position as the frontier pixel F as the absolute value of the pixel value increases. Moreover, a pixel value with a high absolute value may be added to the new pixel value n with reference to the pixel value in the original image P0 at the same position as the end point pixel G as the absolute value of the pixel value increases. Here, when the pixel value of the frontier pixel F or the like to be referred is negative, the value added to the new pixel value n is negative. When the pixel value of the frontier pixel F or the like to be referred is positive, the value added to the new pixel value n is positive.

The fragment eliminated image P8 generated in the modification contains a portion to which the line connection is performed, the portion being highlighted to be darker than the linear configuration prior to the line connection. Specifically, the profile of the fragment eliminated image P8 includes a region protruding by three pixels. It is not considered from the fragment eliminated image P8 generated in this manner that the linear configuration is connected smoothly. However, the fragment eliminated image P8 is a middle image for image processing, and thus is not suitable for diagnosis.

Figure 34:
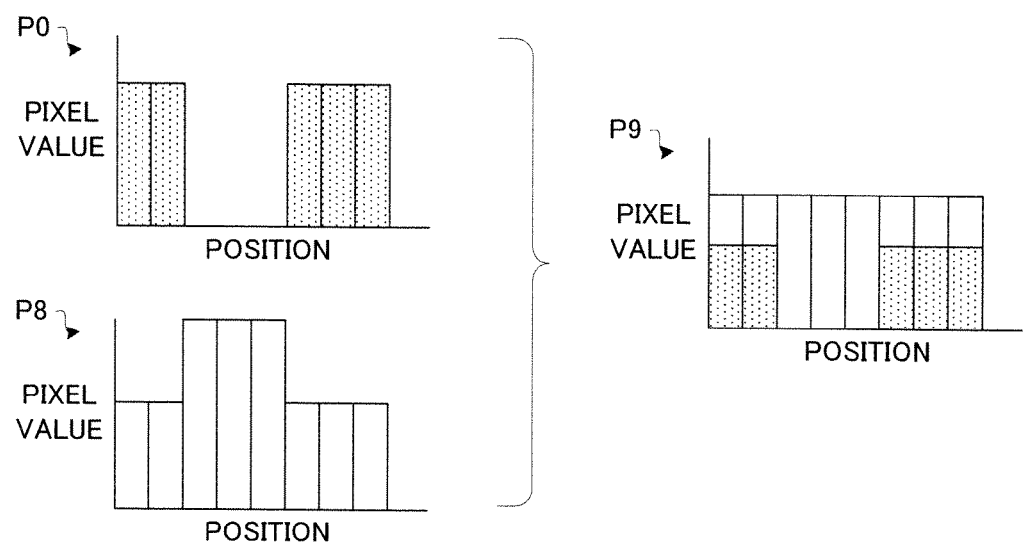

FIG. 34 illustrates a profile of generating a superimposed image P9 in the modification. Now focus on the pixel values of the pixel in FIG. 34. The profile of the superimposed image P9 includes no protrusion and thus is identical. In other words, the superimposed image P9 at this time has eight pixels arranged horizontally in one row with the same pixel value as illustrated on the right of FIG. 35. Accordingly, the portion expanded through the line connection is not distinguishable. Such ideal line connection is obtainable through generation of the superimposed image P9. Specifically, the protrusion of the profile of the fragment eliminated image P8 compensates the recess of the profile of the original image P0 to be cancelled upon generating the superimposed image P9. Accordingly, the superimposed image P9 has high visibility with which suitable diagnosis can be conducted.

No linear configuration appears on the pixels in the original image whose position corresponds to a position of the pixels subjected to the line connection in the fragment eliminated image P8 generated in the present invention. Consequently, the pixels with superimposition of the pixel subjected to the line connection on the pixel in the fragment eliminated image at the same position in the original image has a lower pixel value by a small density of the pixels in the original image. Accordingly, the above embodiment controls the absolute value of the changed value to be higher. Such a construction eliminates generation of a partially-thin linear configuration in the superimposed image P9, achieving a superimposed image P9 with superior visibility.

2. In the above embodiments, the configuration extending direction vector is assigned with the frontier pixel F. However, the present invention is not limited to this construction. Specifically, a configuration extending direction vector is determined so as to be assigned with each of the candidate pixels T for calculating the connection confidence value R.

In this case, the angle θ is formed by the configuration extending direction vector starting the candidate pixel T as a starting point and the pixel arrangement direction vector. The angle θ is located in the angle mapping image Q3 at the same position as that of the candidate pixel T as a starting point of the configuration extending direction vector. Moreover, the configuration extending direction vectors concerning the candidate pixel T and the frontier pixel F may be determined. In this case, the angle θ is determined for each of the configuration extending direction vectors. Then, the connection confidence value R may be calculated from the angles.

3. In the embodiments mentioned above, the connection confidence value R is calculated from the angle θ and the pixel values of the candidate pixels T. However, the present invention is not limited to the construction. Specifically, the connection confidence value R may be calculated from the pixel value of the frontier pixel F instead of the pixel values of the candidate pixels T. Alternatively, the connection confidence value R may be calculated from both the pixel values of the candidate pixels T and the pixel value of the frontier pixel F.

INDUSTRIAL APPLICABILITY

As noted above, the image processing apparatus according to the present invention is suitable for medical fields.

REFERENCE SIGN LIST n new pixel value (changed pixel value)
F frontier pixel (start point pixel)
G end point pixel
P0 original image
P3 evaluation image
P5 direction image
P6 difference image
P7 extracted image
P8 fragment eliminated image
P9 superimposed image
T candidate pixel
15 evaluation image generating unit (evaluation image generating device)
16 direction image generating unit (direction image generating device)
17 difference image generating section (difference image generating device)
19 line connecting processor (line connecting device)
18 extraction image generating section (extraction image generating device) unit
20 superimposed image generating unit (superimposed image generating device)

The invention claimed is:

1. An image processing method comprising the steps of:
generating an evaluation image used for evaluating for each of pixels whether or not a pixel belongs to a linear configuration in an original image;
generating a direction image based on the original image, the direction image indicating a direction of pixels corresponding to the linear configuration in the original image;
generating a difference image based on the direction image, the difference image being obtained by subtracting pixel values other than the linear configuration from pixel values of the linear configuration in the original image;
generating an extraction image with the linear configuration in the original image extracted therefrom based on the evaluation image and the difference image; and
connecting fragments of the linear configuration in the extracted image to generate a fragment eliminated image by obtaining an extending direction of the linear configuration based on the direction image, determining a start point pixel and an end point pixel arranged in the extending direction in the extraction image, and interpolating between the two pixels.

2. The image processing method according to claim 1, wherein the connecting step includes determining a pixel, whose pixel value equal to or more than a threshold, from the pixels in the extraction image as the start point pixel.

3. The image processing method according to claim 1, wherein the connecting step includes:
obtaining a direction of connecting one of the candidate pixels with the start point pixel set in advance;
obtaining the extending direction of the linear configuration containing the start point pixel from the direction image; and
preferentially determining one of the candidate pixels as the end point pixel, the determined candidate pixel having the highest degree of coincidence of the two obtained directions among the other candidate pixels.

4. The image processing method according to claim 1, wherein the connecting steps includes determining the candidate pixel determined to have a high absolute value of the pixel value from the candidate pixels in the extraction image as the end point pixel.

5. The image processing method according to claim 1, wherein the connecting steps includes performing line connection by changing a pixel value of a pixel between the start point pixel and the end point pixel.

6. The image processing method according to claim 5, wherein the connecting steps includes:
calculating a distance between the start point pixel and a target subjected to pixel change and a distance between the target subjected and the end point pixel to the pixel change; and
determining the changed pixel value so as to approach a pixel value of either the start point pixel or the end point pixel closer to the target subjected to the pixel change.

7. The image processing method according to claim 5, wherein the connecting step includes using a pixel value with a higher absolute value when a plurality of changed pixel values is calculated at the same position in the extraction image.

8. The image processing method according to claim 1, further comprising:
superimposing the fragment eliminated image on the original image to generate a superimposed image, wherein the line connecting device determines the changed pixel value; and
thereafter controlling the changed pixel value so as the absolute value thereof to be equal to or more than the absolute values of the pixel values of the start point pixel and the end point pixel, thereby highlighting an expanded line in the fragment eliminated image.

* * * * *